(12) United States Patent
Elran et al.

(10) Patent No.: US 11,875,432 B2
(45) Date of Patent: *Jan. 16, 2024

(54) METHOD AND APPARATUS FOR USING A PARAMETERIZED CELL BASED CIRCULAR SORTING ALGORITHM

(71) Applicant: CANON MEDICAL SYSTEMS CORPORATION, Otawara (JP)

(72) Inventors: Ehod Elran, Vernon Hills, IL (US); Yi Qiang, Vernon Hills, IL (US); Vishnu Balaraman, Vernon Hills, IL (US)

(73) Assignee: CANON MEDICAL SYSTEMS CORPORATION, Otawara (JP)

(*) Notice: Subject to any disclaimer, the term of this patent is extended or adjusted under 35 U.S.C. 154(b) by 113 days.

This patent is subject to a terminal disclaimer.

(21) Appl. No.: 17/352,825

(22) Filed: Jun. 21, 2021

(65) Prior Publication Data

US 2021/0327106 A1  Oct. 21, 2021

Related U.S. Application Data

(63) Continuation of application No. 16/853,246, filed on Apr. 20, 2020, now Pat. No. 11,069,097.

(51) Int. Cl.
*G06K 9/00* (2022.01)
*G06T 11/00* (2006.01)
*G06T 7/00* (2017.01)

(52) U.S. Cl.
CPC .......... *G06T 11/005* (2013.01); *G06T 7/0016* (2013.01); *G06T 2207/10104* (2013.01)

(58) Field of Classification Search
CPC . G06T 2207/10081; G06T 2207/10104; G06T 2207/10108;

(Continued)

(56) References Cited

U.S. PATENT DOCUMENTS 5,644,610 A * 7/1997 Crawford ............... G06T 11/005
378/19
6,774,370 B1  8/2004 Uchida et al.
(Continued)

FOREIGN PATENT DOCUMENTS

JP  4621188 B2  1/2011
JP  106199674 A  12/2016

OTHER PUBLICATIONS

Chao Wang, et al., "A Real Time Coincidence System for High Count-Rate TOF or Non-TOF PET Cameras Using Hybrid Method Combining AND-Logic and Time-Mark Technology", IEEE TRANS. NUCL. SCI., vol. 57, No. 2, Apr. 1, 2010, pp. 708-714.

*Primary Examiner* — Atiba O Fitzpatrick
(74) *Attorney, Agent, or Firm* — Oblon, McClelland, Maier & Neustadt, L.L.P.

(57) ABSTRACT

A method of grouping detection events in an imaging apparatus is described herein. The detection events can include primary detection events and secondary scattered events, which are frequently discarded due to the secondary scattered events, thus reducing sensitivity of the dataset for eventual image reconstruction. The method includes cell modules cascaded with identical parametrized cells, in a pipeline fashion, having the last cell in the chain circle back to the first cell. A rotating data pointer indicates the location of the first entry in the cell pipeline. The described method enables the grouping of multiple samples of detector data in real time with no loss of information, based on a time and location of the detected event. The method can be implemented in an FPGA as a hardware-based real time process.

13 Claims, 21 Drawing Sheets

(58) Field of Classification Search
CPC ........ G06T 2207/10116–10128; G06T 11/005; G06T 7/0016; G06T 7/0014; G06T 2207/20021; A61B 6/037; A61B 6/5282; A61B 6/483; A61B 6/4258; A61B 6/4241; A61B 6/4014; G01N 2223/1013; G01N 2223/063; G01N 23/20066; G06V 10/25; G01T 1/2985; G01T 1/164; G01T 1/1641; G01T 1/1642; G01J 2001/442; G09G 2310/0297

See application file for complete search history.

(56) References Cited

U.S. PATENT DOCUMENTS

| | | | |
|---|---|---|---|
| 6,791,090 B2* | 9/2004 | Lin | G01T 1/242 |
| | | | 250/336.1 |
| 7,205,546 B1 | 4/2007 | Kennedy | |
| 7,567,620 B2 | 7/2009 | Rozental | |
| 9,625,310 B2* | 4/2017 | Bouhnik | G01J 1/4228 |
| 2002/0011571 A1 | 1/2002 | Lin et al. | |
| 2011/0150181 A1* | 6/2011 | Cook | G01T 1/1648 |
| | | | 378/86 |
| 2011/0311019 A1* | 12/2011 | Ribbing | A61B 6/5282 |
| | | | 378/9 |
| 2015/0003591 A1* | 1/2015 | Schweizer | A61B 6/481 |
| | | | 378/62 |
| 2016/0169737 A1* | 6/2016 | Bouhnik | G01T 1/164 |
| | | | 250/208.1 |
| 2016/0209524 A1* | 7/2016 | Laurence | G01T 1/40 |
| 2019/0066342 A1* | 2/2019 | Zhu | G06T 11/005 |
| 2019/0212457 A1 | 7/2019 | Li et al. | |
| 2019/0391282 A1* | 12/2019 | Hugg | A61B 6/502 |
| 2020/0367839 A1* | 11/2020 | Iniewski | A61B 6/037 |

\* cited by examiner

METHOD AND APPARATUS FOR USING A PARAMETERIZED CELL BASED CIRCULAR SORTING ALGORITHM

CROSS REFERENCE TO RELATED APPLICATIONS

This application is a continuation application of U.S. application Ser. No. 16/853,246, filed Apr. 20, 2020, the entire contents of which are incorporated herein by reference.

FIELD OF THE INVENTION

This disclosure relates to a method and apparatus for providing a parameterized cell-based circular sorting algorithm based on timestamp and location to improve sensitivity in energy calibration, system performance, and reconstructed image quality.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Positron emission tomography (PET) is a functional imaging modality that is capable of imaging biochemical processes in humans or animals through the use of radioactive tracers. In PET imaging, a tracer agent is introduced into the patient to be imaged via injection, inhalation, or ingestion. After administration, the physical and bio-molecular properties of the agent cause it to concentrate at specific locations in the patient's body. The actual spatial distribution of the agent, the intensity of the region of accumulation of the agent, and the kinetics of the process from administration to its eventual elimination are all factors that may have clinical significance.

During this process, a tracer attached to the agent will emit positrons. When an emitted positron collides with an electron, an annihilation event occurs, wherein the positron and electron are combined. Most of the time, an annihilation event produces two gamma rays (at 511 keV) traveling at substantially 180 degrees apart.

In positron emission tomography (PET), the measured coincidences include both true coincidences and a background signal (e.g., random coincidences). To improve the image quality of a reconstructed PET signal, it is desirable to estimate and account for this background signal. The background signal includes counts due to random events and scatter events. In PET, the background signal is primarily made up of accidental coincidences, also known as randoms, and scatters.

Although most scattered photons in the body leave the detector plane undetected, some scattered photons are still detected and registered, resulting in an incorrect line-of-response (LOR). The scatter events can occur in the detector crystals themselves when some energy scatters from a first crystal receiving the radiation and deposits into adjacent crystals. In certain implementations, some of these scattered events resulting in incorrect LORs can be removed by energy discrimination because photons lose a fraction of their energy during the Compton interaction giving rise to the scatter event. Even so, some scattered photons (scatters) and some random coincidences (randoms) will inevitably be recorded, and, thus, the background signal includes the randoms and the scatters.

Thus, a method and apparatus for improving real-time determination of detected radiation and true or random coincidences is desired.

SUMMARY

The present disclosure relates to an imaging apparatus, including: processing circuitry configured to detect a first event at a first detector crystal in a detector array including detector crystals grouped into detector blocks, each detector crystal configured to detect primary events of gamma rays and secondary scattering events of the gamma rays, the first event including first time information, first energy information, and first location information, assign the first event and the first time information, the first energy information, and the first location information to a first cell of a demultiplexer, determine, based on the first time information of the first event, a first time window for the first event, the first time window having a predetermined length of time, determine, based on the first location information of the first event, a location of a first detector block including the first detector crystal, determine a first zone assignment of the first event, the first zone assignment including at least the first detector block and defining an area around the first detector block within which additional events can be detected and related to the first event, detect a second event at a second detector crystal, the second event including second time information, second energy information, and second location information, determine, based on the second time information and the second location information of the second event, if the second event is detected within the first time window of the first event and within the first zone assignment of the first event, upon determining the second event is detected within the first time window and the first zone assignment of the first event, group the second event with the first event in the first cell of the demultiplexer, the second event being a detected scatter event of the first event, and upon determining the second event is not detected within the first time window or within the first zone assignment of the first event: assign the second event and the second time information, the second energy information, and the second location information to a second cell of the demultiplexer, the second event being a detected primary event, determine, based on the second time information of the second event, a second time window for the second event, the second time window having the predetermined length of time, determine, based on the second location information of the second event, a location of a second detector block including the second detector crystal, and determine a second zone assignment of the second event, the second zone assignment including at least the second detector block and defining an area around the second detector block within which additional events can be detected and related to the second event.

The disclosure additionally relates to a method of grouping detection events in an imaging apparatus, including: detecting a first event at a first detector crystal in a detector array including detector crystals grouped into detector blocks, each detector crystal configured to detect primary events of gamma rays and secondary scattering events of the gamma rays, the first event including first time information, first energy information, and first location information; assigning the first event and the first time information, the first energy information, and the first location information to a first cell of a demultiplexer; determining, based on the first time information of the first event, a first time window for the first event, the first time window having a predetermined length of time; determining, based on the first location information of the first event, a location of a first detector block including the first detector crystal; determining a first zone assignment of the first event, the first zone assignment including at least the first detector block and defining an area around the first detector block within which additional events can be detected and related to the first event; detecting a second event at a second detector crystal, the second event including second time information, second energy information, and second location information; determining, based on the second time information and the second location information of the second event, if the second event is detected within the first time window of the first event and within the first zone assignment of the first event; upon determining the second event is detected within the first time window and the first zone assignment of the first event, grouping the second event with the first event in the first cell of the demultiplexer, the second event being a detected scatter event of the first event; and upon determining the second event is not detected within the first time window or within the first zone assignment of the first event: assigning the second event and the second time information, the second energy information, and the second location information to a second cell of the demultiplexer, the second event being a detected primary event; determining, based on the second time information of the second event, a second time window for the second event, the second time window having the predetermined length of time; determining, based on the second location information of the second event, a location of a second detector block including the second detector crystal; and determining a second zone assignment of the second event, the second zone assignment including at least the second detector block and defining an area around the second detector block within which additional events can be detected and related to the second event.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1A:
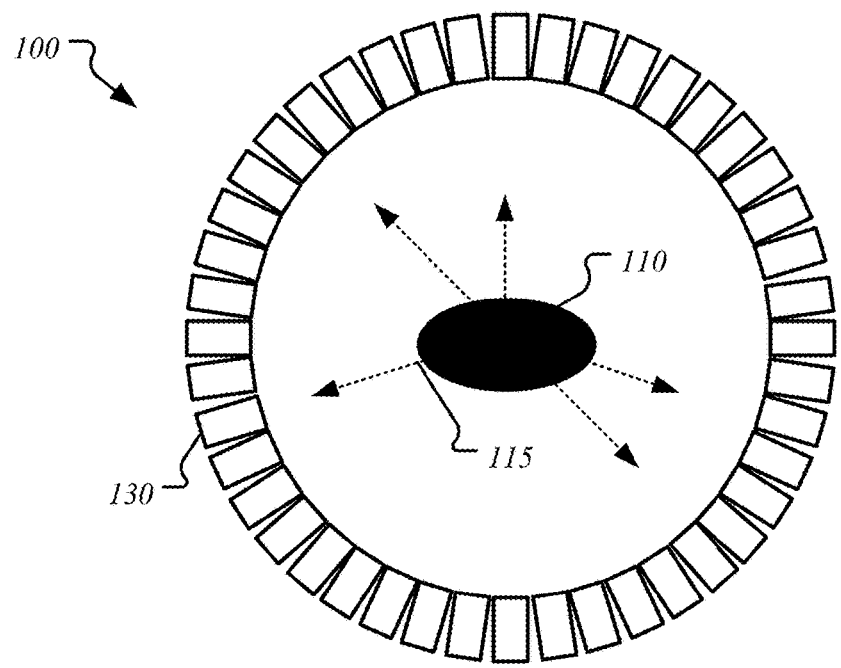
FIG. 1A shows a transaxial cross-sectional schematic of a PET scanner, according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The system may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Figure 18A:
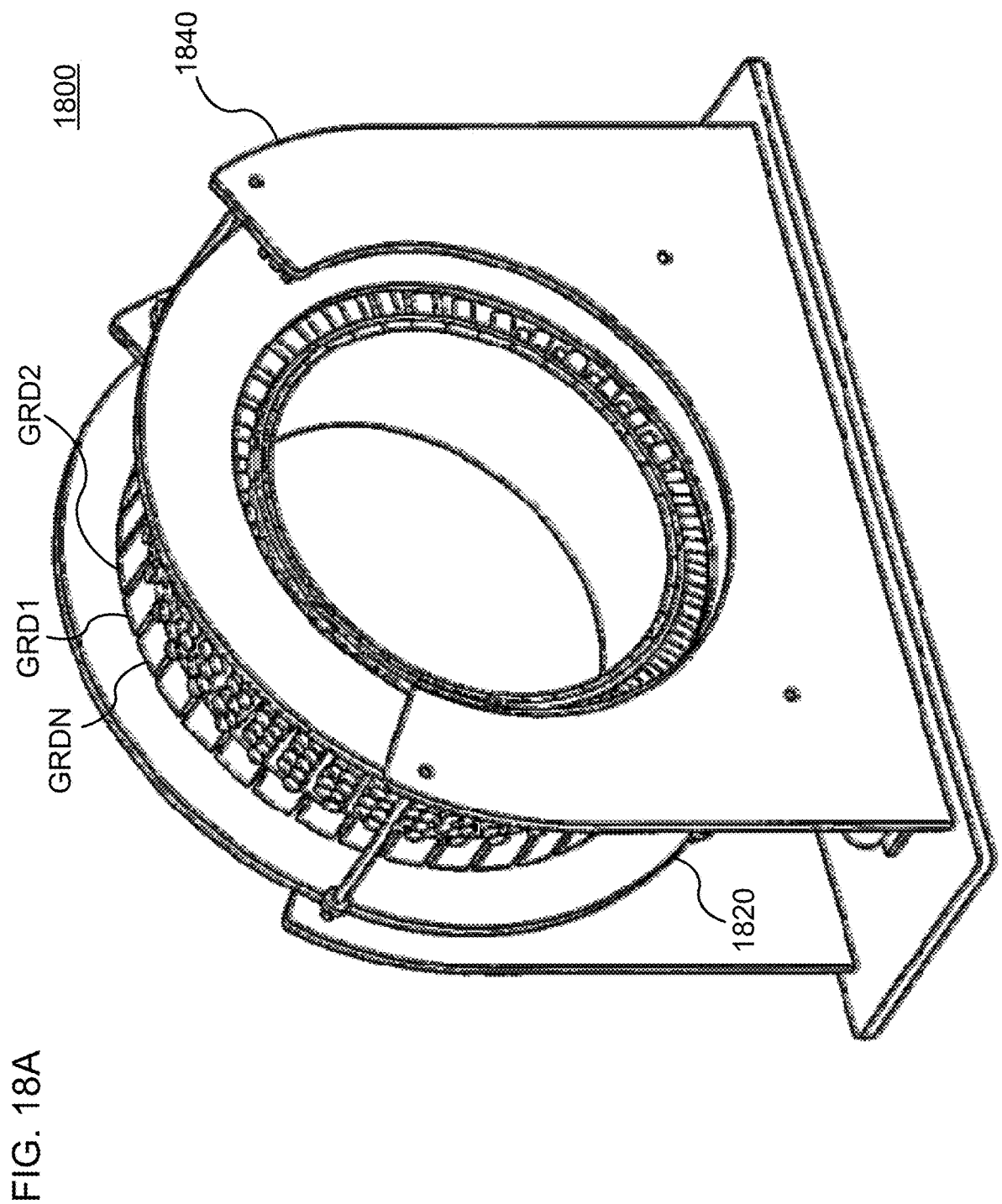
FIG. 18A shows a perspective view of a positron-emission tomography (PET) scanner, according to an embodiment of the present disclosure.
Figure 18B:
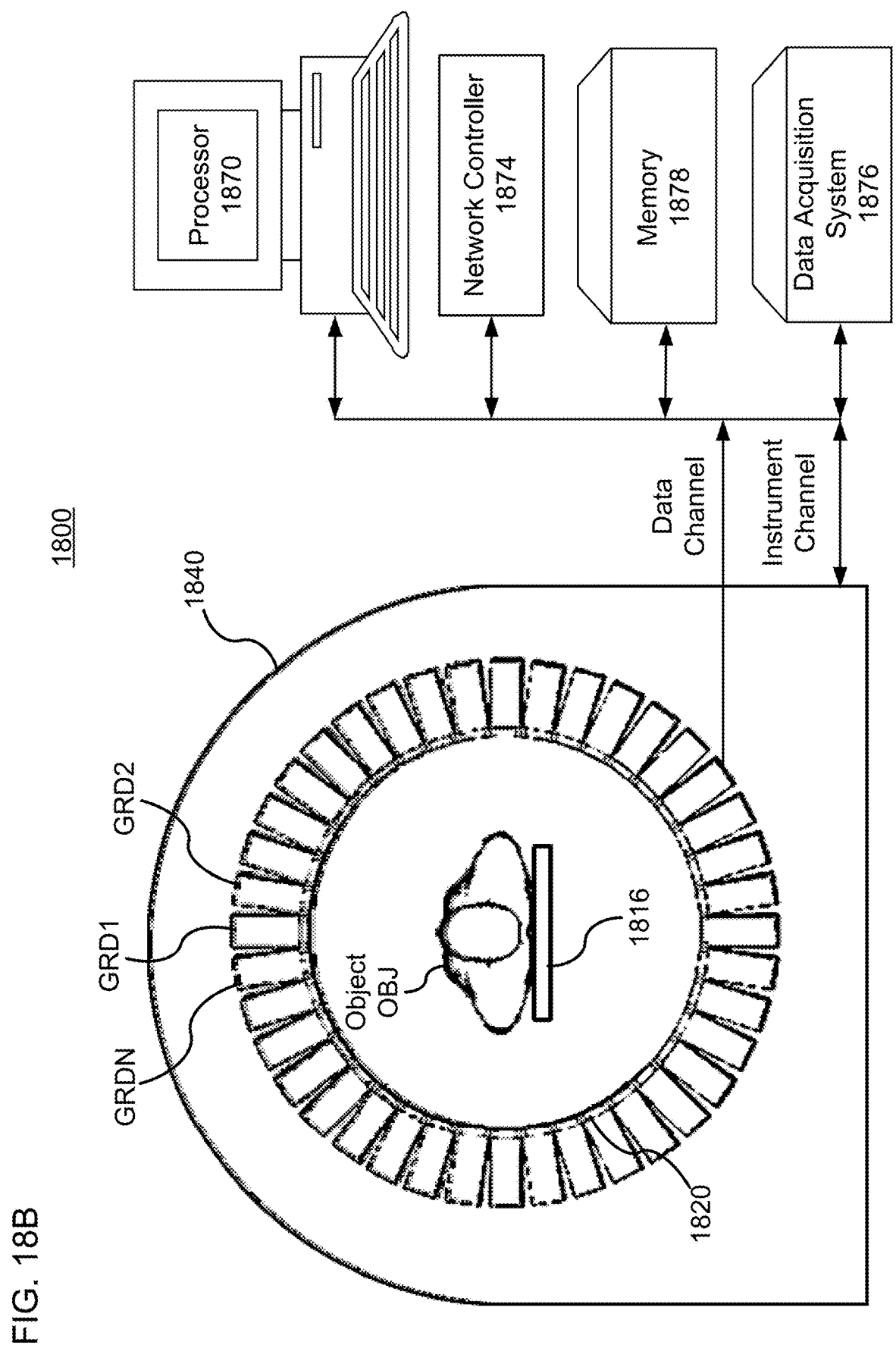
FIG. 18B shows a schematic view of a PET scanner, according to an embodiment of the present disclosure.

FIG. 1A shows a transaxial cross-sectional schematic of a PET scanner 100, according to an embodiment of the present disclosure. In an embodiment, the PET scanner 100 includes detector blocks 130 arranged in a ring around a central axis that are configured to detect gamma rays. The PET scanner 100 can include additional rings of detector blocks 130 disposed along the axis of the rings. Additional PET scanner 100 features are shown in FIGS. 18A and 18B and described in the accompanying description below. An object 110 to be scanned can be arranged in the center of the detector blocks 130, such as a phantom or a human.

Figure 1B:
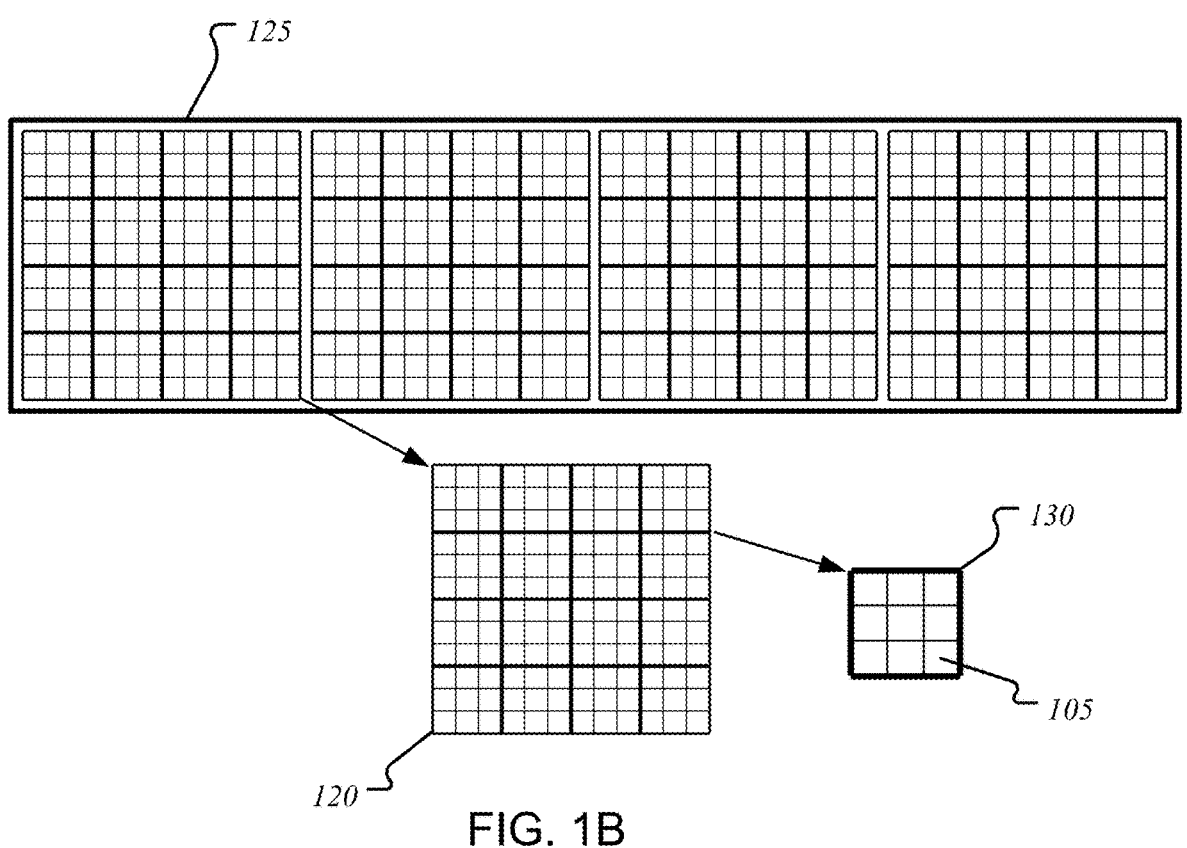
FIG. 1B shows efficiency normalization in an axial domain for a first crystal, according to an embodiment of the present disclosure.

FIG. 1B shows a schematic of a detector module 125, according to an embodiment of the present disclosure. The detector module 125, as shown, can be a top-down view of one of the rings flattened. The detector module 125 can include sub-modules 120. The sub-modules 120 can include the detector blocks 130. The detector blocks 130 can include detector crystals 105, which can also be referred to as detector elements.

As previously described, when an emitted positron from the phantom or human collides with an electron, an annihilation event occurs, wherein the positron and electron are combined. Most of the time, the annihilation event produces two gamma rays (at 511 keV) traveling at substantially 180 degrees apart. One of these gamma rays can be referred to as a single 115. To reconstruct the spatio-temporal distribution of the tracer via tomographic reconstruction principles, each detected event is characterized for its energy (i.e., amount of light generated), its location, and its timing. By detecting the two gamma rays (i.e. two of the singles 115), and drawing a line between their locations, i.e., the line-of-response (LOR), one can determine the likely location of the original disintegration. The singles 115 that have been paired into the two singles 115 traveling at substantially 180 degrees apart from the annihilation event can be referred to as a pair.

Figure 1C:
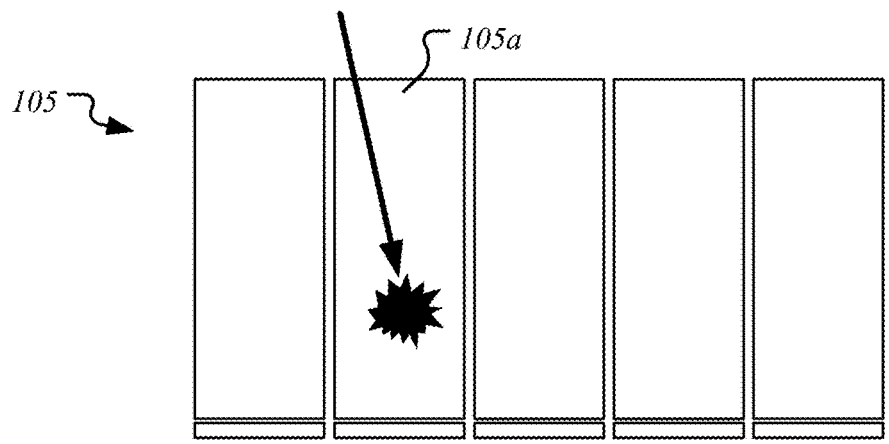
FIG. 1C shows a schematic of detection without scattering, according to an embodiment of the present disclosure.
Figure 1D:
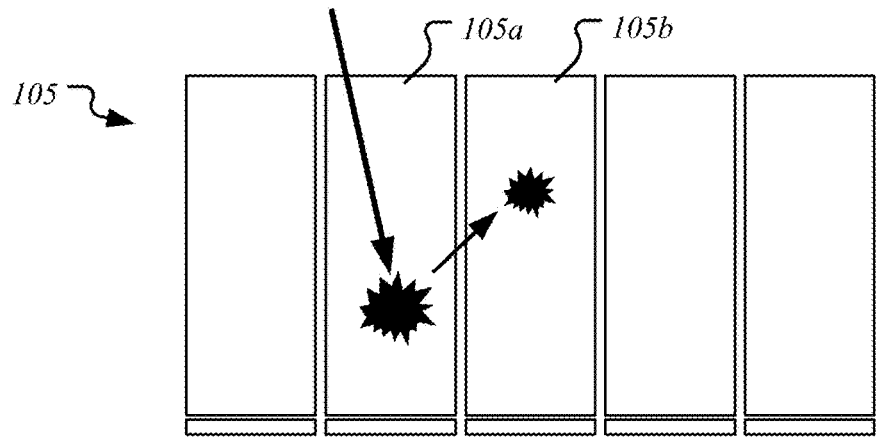
FIG. 1D shows a schematic of detection with a single scatter event, according to an embodiment of the present disclosure.
Figure 1E:
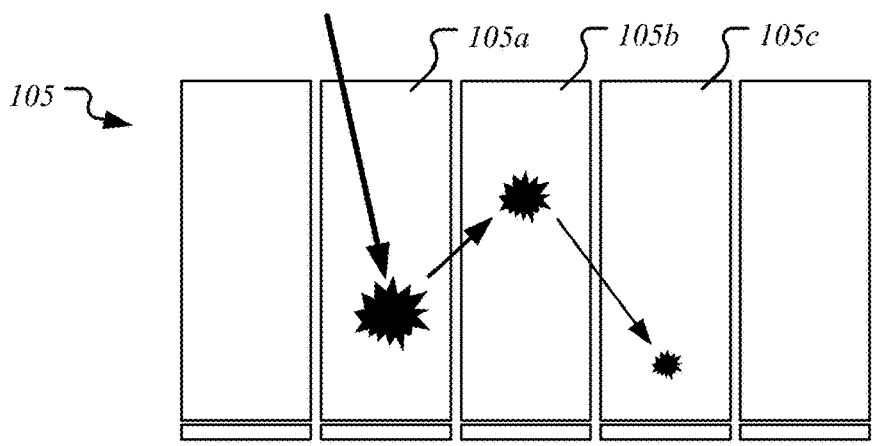
FIG. 1E shows a schematic of detection with a multiple scatter event, according to an embodiment of the present disclosure.

FIG. 1C shows a schematic of detection without scattering, according to an embodiment of the present disclosure. FIG. 1D shows a schematic of detection with a single scatter event, according to an embodiment of the present disclosure. FIG. 1E shows a schematic of detection with a multiple scatter event, according to an embodiment of the present disclosure.

In an embodiment, when the single 115 is absorbed by the detector module 125, energy of the single 115 (i.e. the gamma ray) is deposited into a first crystal 105a. In an ideal detection event, there is no additional scattering and the first crystal 105a hit by the single 115 registers the event at a location of the first crystal 105a (FIG. 1C). Ideally, a corresponding crystal opposite the location of the first crystal 105a in the detector module 125 would detect the single 115 traveling at substantially 180 degrees apart from the annihilation event, allowing for a proper LOR to be determined. Furthermore, the detected energy for each of the singles 115 would measure substantially equal to 511 keV. In addition to the location and the energy of the detected single 115, a time of detection (e.g. a time stamp) can be registered with the detection event. This can be regarded as an entirely photoelectric effect-based detection.

However, often times, some energy of the single 115 scatters (e.g. via Compton scattering) and deposits into another crystal, for example, a second crystal 105b adjacent to the first crystal 105a (FIG. 1D). In such a scenario, a second detection event is registered having a second unique energy, location, and time stamp. This can be regarded as a mixed Compton and photoelectric-based detection. The scattering of the single 115 can occur additional times, such as in FIG. 1E, wherein two scattering events occur from the first crystal 105a to the second crystal 105b, and again from the second crystal 105b to another crystal, for example, a third crystal 105c adjacent to the second crystal 105b. In such a scenario, a third detection event is registered having a third unique energy, location, and time stamp.

FIG. IF shows a schematic of zone assignments for the detector blocks 130, according to an embodiment of the present disclosure. In an embodiment, multiple detector blocks 130 can be grouped together to form zones. The size of a zone can be adjusted based on the number of the detector blocks 130 grouped into the zone. For example, two of the detector blocks 130 can be grouped to form a base zone (denoted by the number zero (0) in FIG. 1F). Additional groupings of this size can be expanded vertically and horizontally to form a "plus" or (+) shape, which can be referred to as a first expanded zone (expansions denoted by the number "1"'s in FIG. 1F, while also including the base zone). Similarly, the corners of the plus shape can be filled via additional groupings to form a second expanded zone (expansions denoted by the number "2"'s in FIG. 1F, while also including the base zone and the first expanded zone). Additional expansions can be contemplated. The zones can be formed and adjusted to group detection events and capture any potential scatter events that occur.

Discarding events due to scattered energy deposited can reduce the singles 115 sensitivity by approximately 30%, and the pairs sensitivity by approximately 50% (the singles 115 efficiency squared). As described herein, assembling multiple events of detector data based on timestamp and location, allows for recovery of "information" (energy) scattered from the primary hit. The assembled mode allows greater sensitivity in the energy calibration of the PET system. This in turn will improve system performance and image quality.

Figure 2:
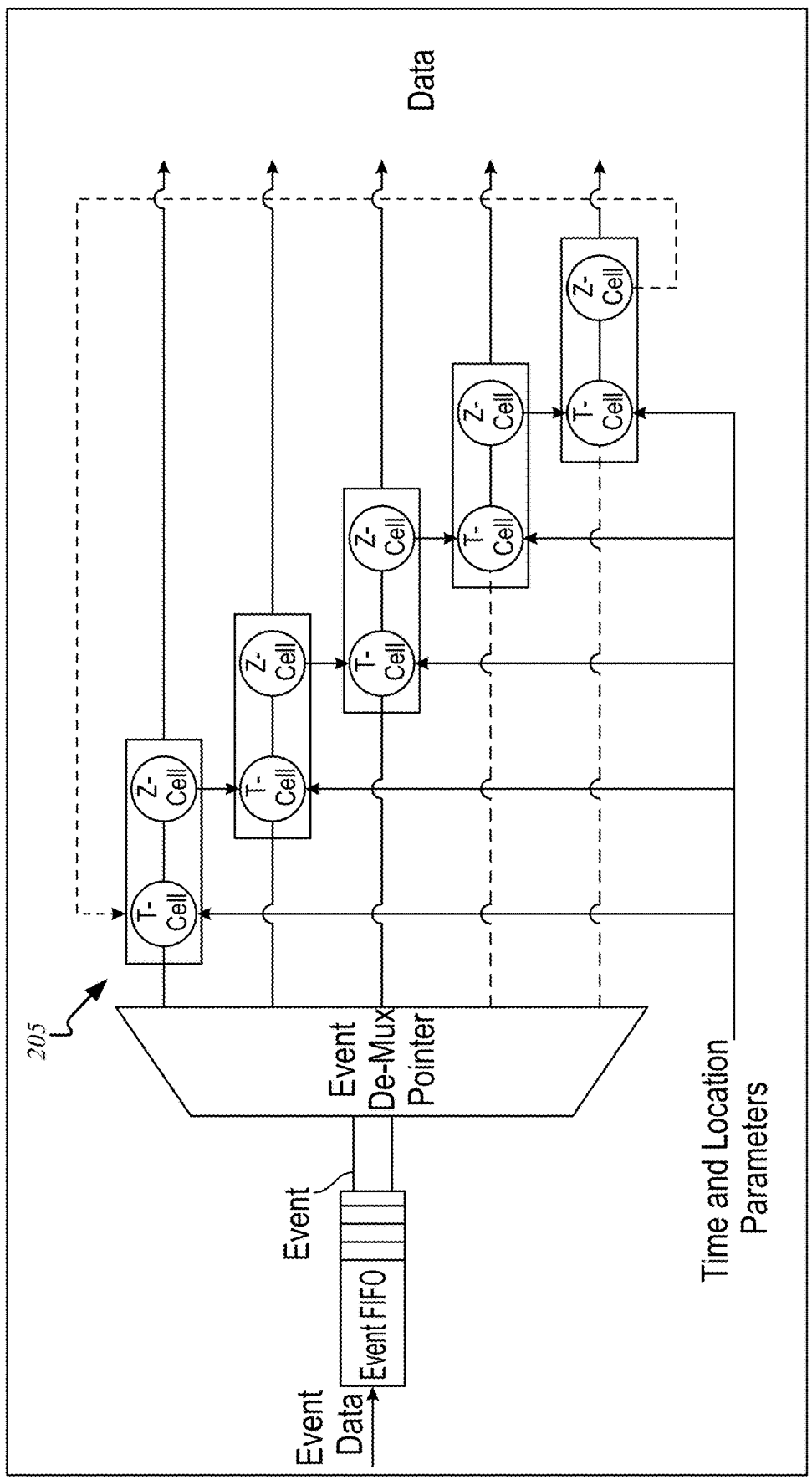
FIG. 2 shows an assembled demultiplexer module block diagram, according to an embodiment of the present disclosure.

FIG. 2 shows an assembled demultiplexer module block diagram, according to an embodiment of the present disclosure. The assembled demultiplexer module can be constructed around parameterized cells 205. The assembled multiplexer module can include a predetermined number of parameterized cells 205.

Figure 3:
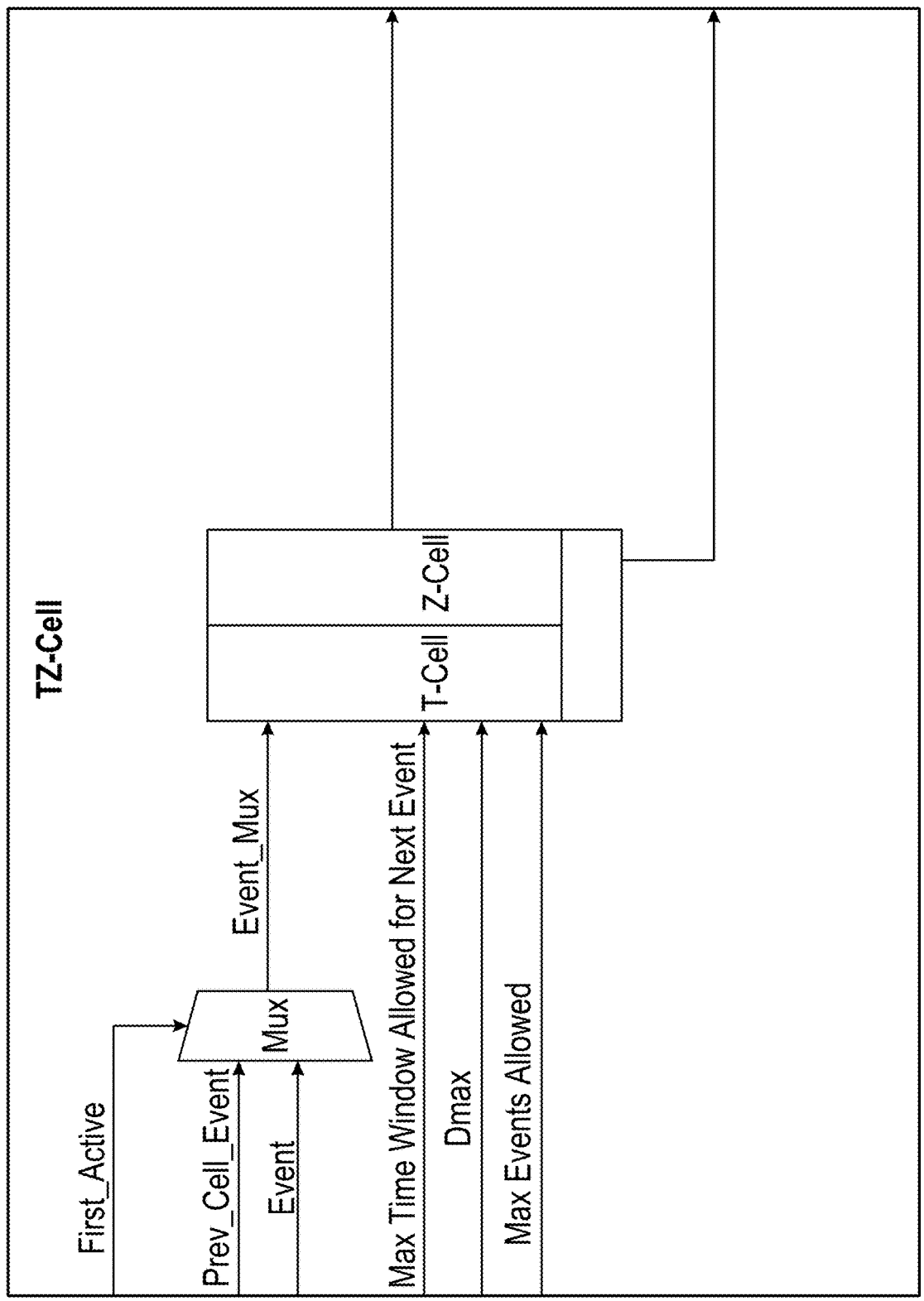
FIG. 3 shows a block diagram of one cell of parameterized cells, according to an embodiment of the present disclosure.

FIG. 3 shows a block diagram of one cell of the parameterized cells 205, according to an embodiment of the present disclosure. The parameterized cells 205 can make independent decisions based on predetermined settings. The predetermined settings can include a time window, a zone assignment, and a number of events allowed to be collected per time window or zone assignment.

In an embodiment, based on the time window setting, the predetermined number of the parameterized cells 205 instantiated in the assembled module is calculated. The parameterized cells 205 can be connected back to back, forming a circular operating chain which allows real time processing with minimum resources. An event pointer can provide an access point for the stream of events. That is, the event pointer can be a rotating data pointer that indicates the location of the first entry in the cell pipeline. The event pointer can rout all events in the stream of events to the active parameterized cell 205 in the active time window. Once one time window ends, the pointer moves to the next parameterized cell 205 in the chain, routing all events to the active parameterized cell 205. In a given time window, the parameterized cell 205 can evaluate whether to retain the event being inquired or send the event to a next parameterized cell 205. Once the time window ends for the corresponding parameterized cell 205, the corresponding parameterized cell 205 will transmit all the assembled events in the corresponding parameterized cell 205. The parameterized cells 205 can group a maximum number of detected events, and the maximum number can be scaled up or down.

The predetermined number of the parameterized cells 205 can be determined by the maximum number of successive events to be compared with the primary event. The maximum number can depend on a max event rate (expected, with a standard deviation), a disparity, and a maximum time window. In one example, the disparity (i.e. the event multiplicity) is 1.16, a standard deviation of the number of secondary scatter events is equal to $\sqrt{0.16}$, or 0.4, and a 4-sigma window to contain all secondary scatter events together with the primary detected event is equal to 1+0.4*4, or 2.6. In the same example, the number of background events mixed with useful events is given by an average number of background events within the time window to be 144 MHz*10 ns, or 1.44, and a standard deviation from a Poisson distribution is equal to $\sqrt{1.44}$, or 1.2, and a 4-sigma confidence level based on the detected events contained within a quadrant of the maximum time window can be given by 1.2*4, or 4.8. Thus, summing 2.6 and 4.8 results in 7.4, which rounds to 8. This means that a ninth event will be outside the time window of a first event, and leads to 5 grouping cells.

Figure 4:
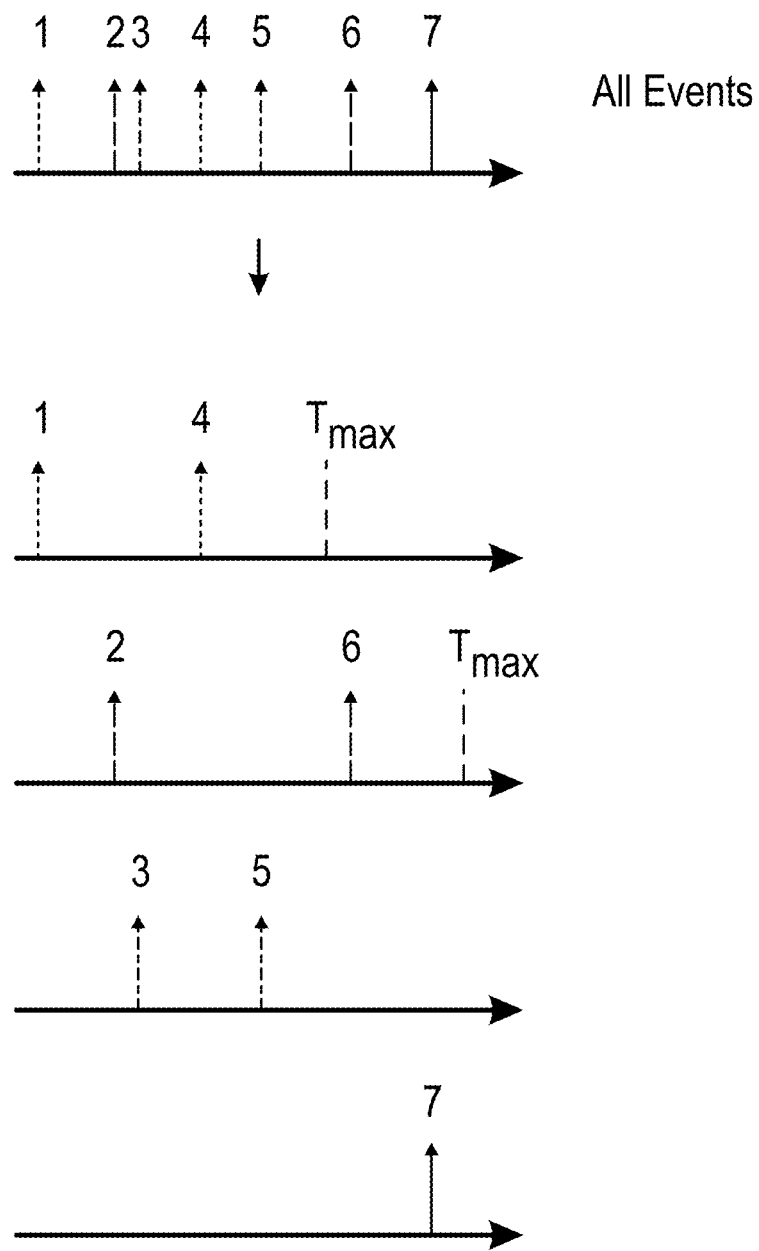
FIG. 4 shows a diagram of an example stream of events, according to an embodiment of the present disclosure.

FIG. 4 shows a diagram of an example stream of events, according to an embodiment of the present disclosure. In an embodiment, the top of FIG. 4 shows all events and the sorted events are shown below. The sorting of the events is described herein.

Figure 1F:
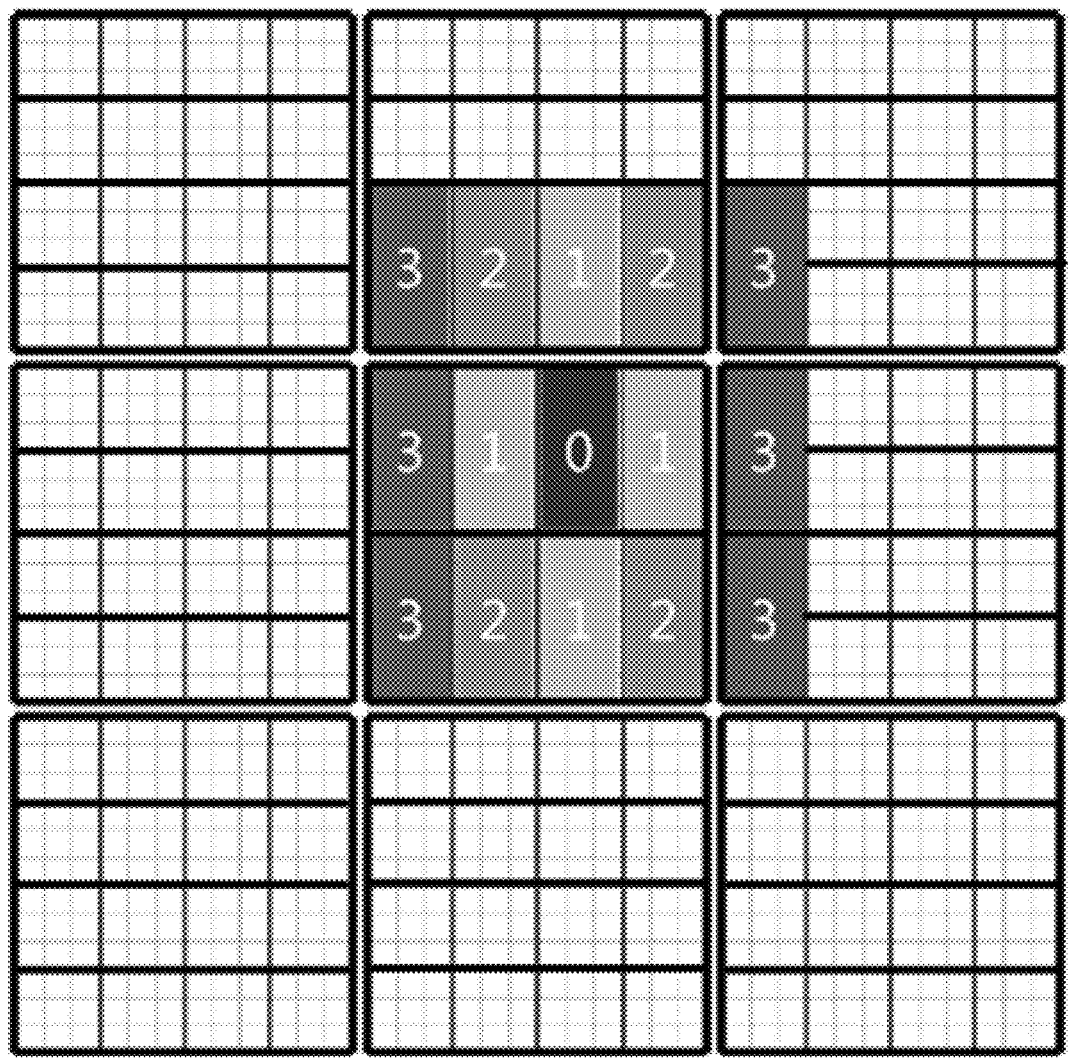
FIG. 1F shows a schematic of zone assignments for detector blocks, according to an embodiment of the present disclosure.
Figure 5:
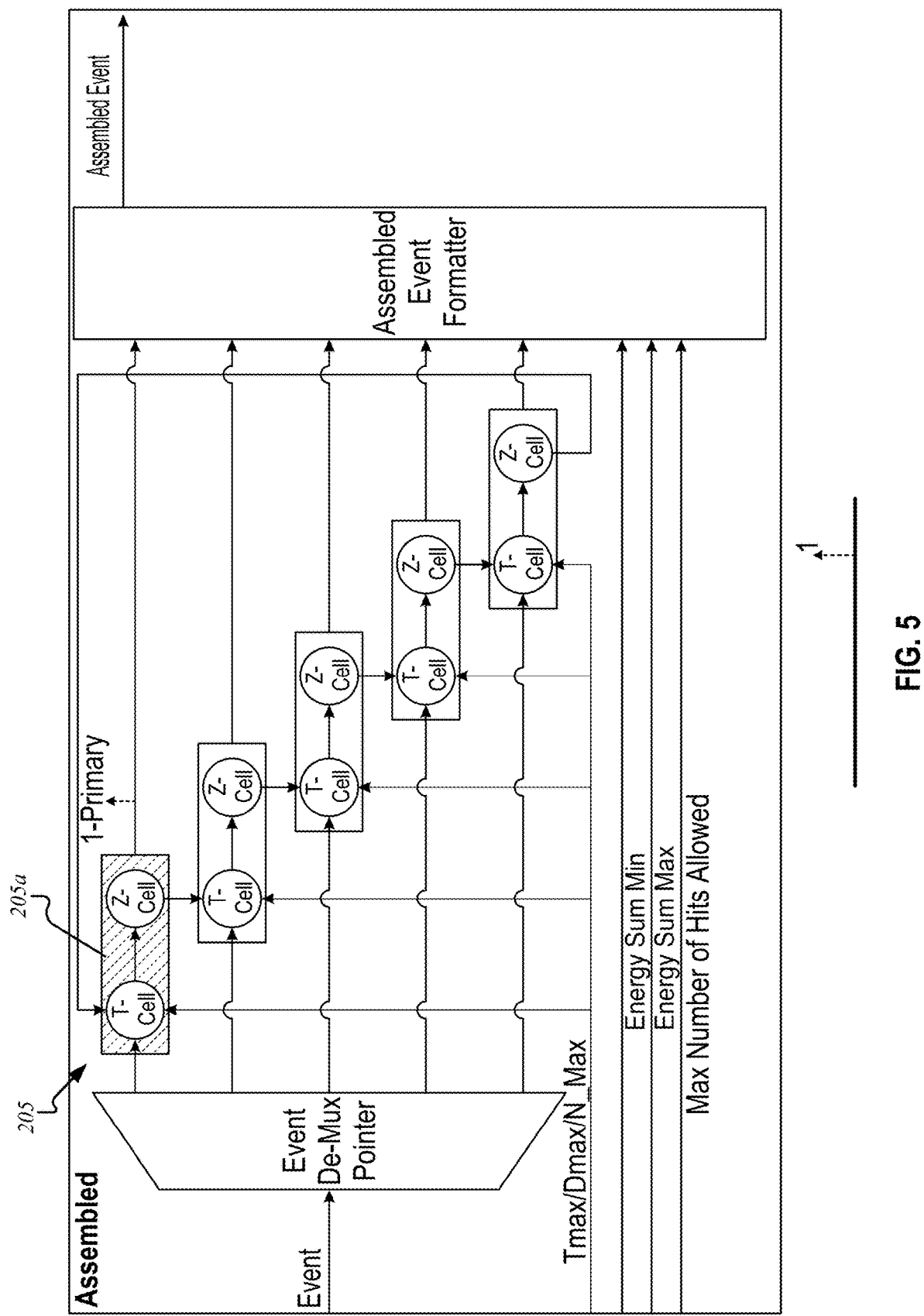
FIG. 5 shows a diagram of an assembled demultiplexer module for a first event, according to an embodiment of the present disclosure.
Figure 6:
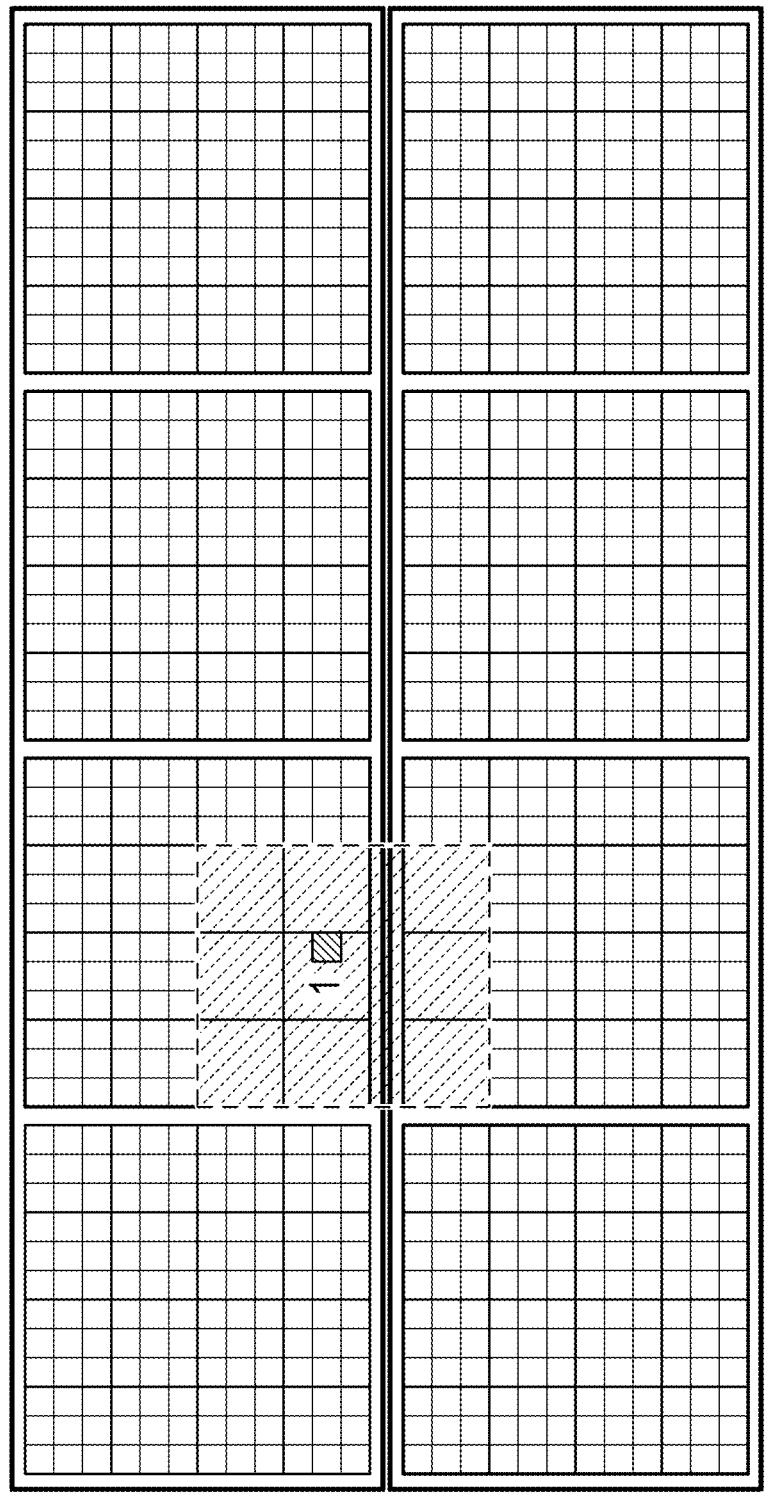
FIG. 6 shows a schematic of a first zone assignment for a first event, according to an embodiment of the present disclosure.

FIG. 5 shows a diagram of the assembled demultiplexer module for a first event, according to an embodiment of the present disclosure. In an embodiment, the first event arrives and a first parameterized cell 205a can be instantiated including a first time window based on a time of detection for the first event. The first time window (and other time windows described herein) can be a predetermined length of time within which additional events can occur and potentially be considered as scatter events stemming from the first event (or from the respective event of the time window). The first parameterized cell 205a can capture the first event and mark the first event as a primary event. FIG. 6 shows a schematic of a first zone assignment for the first event, according to an embodiment of the present disclosure. The first parameterized cell 205a can also generate the first zone assignment, wherein a size (i.e. coverage) and location of the first zone assignment can be based on a location of detection for the first event in order to compare against subsequent incoming events. As shown, the first zone assignment for the first event includes nine of the detector blocks 130 arranged in a 3×3 square, wherein the location of the first event is disposed in a center block of the detector blocks 130. As shown in FIG. 1F, different sizes of the zone assignments can provide different sensitivity and flexibility in determining if a detected event is determined to be a primary event or a scatter event.

A scatter event is determined when i) the time of detection for the scatter event is within the first time window, and ii) the scatter event is detected within the first zone assignment. That is, regarding condition (i), a time difference between the time of detection for the first event and the scatter event is less than the first time window. Thus, by increasing the size of the zone assignment, additional detected events can satisfy condition (ii).

With the aforementioned settings, a second event can be detected and evaluated by the first parameterized cell 205a (or the active parameterized cell), and subsequently rejected by the first parameterized cell 205a for not satisfying both of the aforementioned conditions (i) and (ii). That is, the first parameterized cell 205a can determine the second event is not a scatter event, but rather, a primary event.

Figure 7:
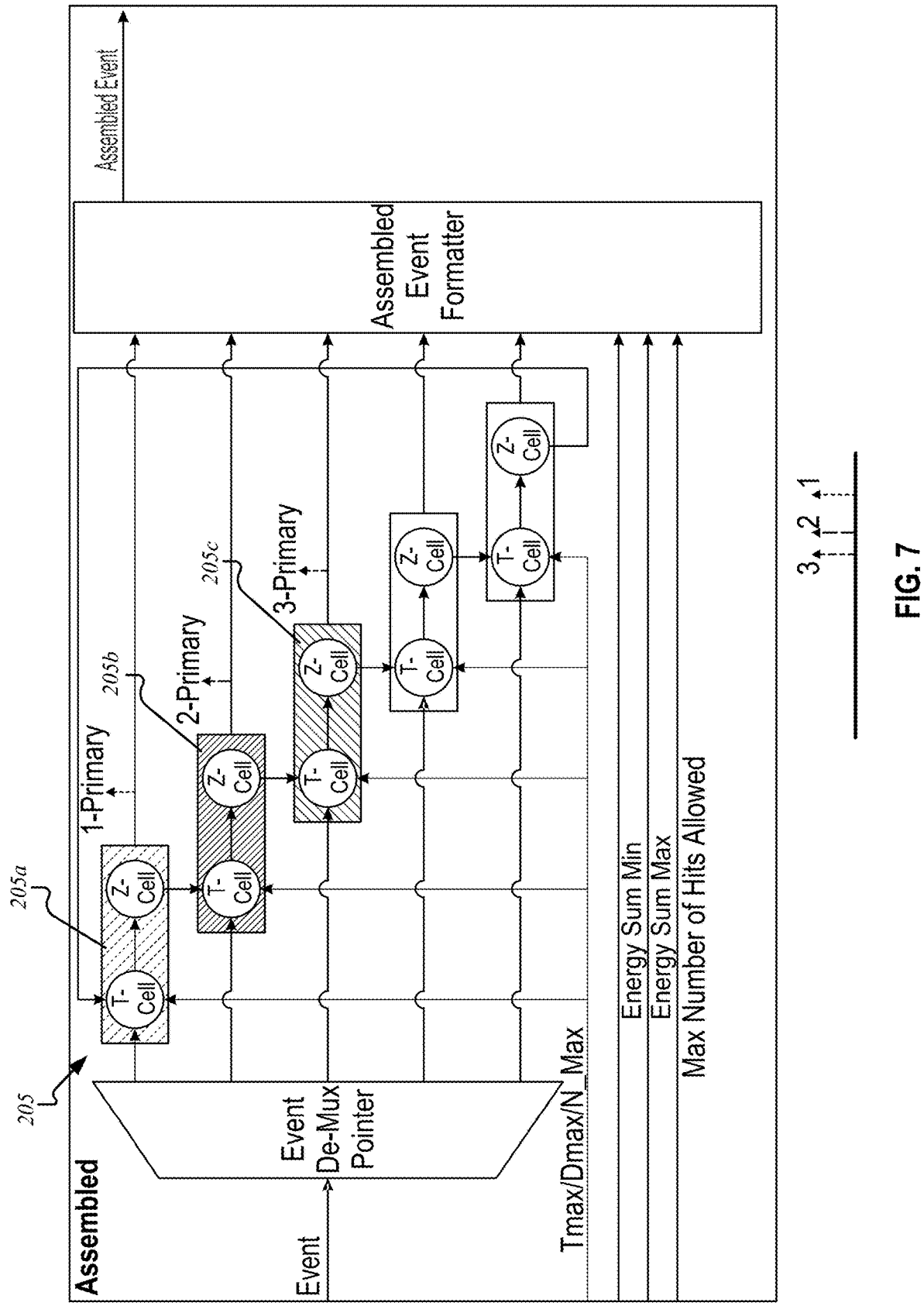
FIG. 7 shows a diagram of an assembled demultiplexer module when triaging events, according to an embodiment of the present disclosure.
Figure 8:
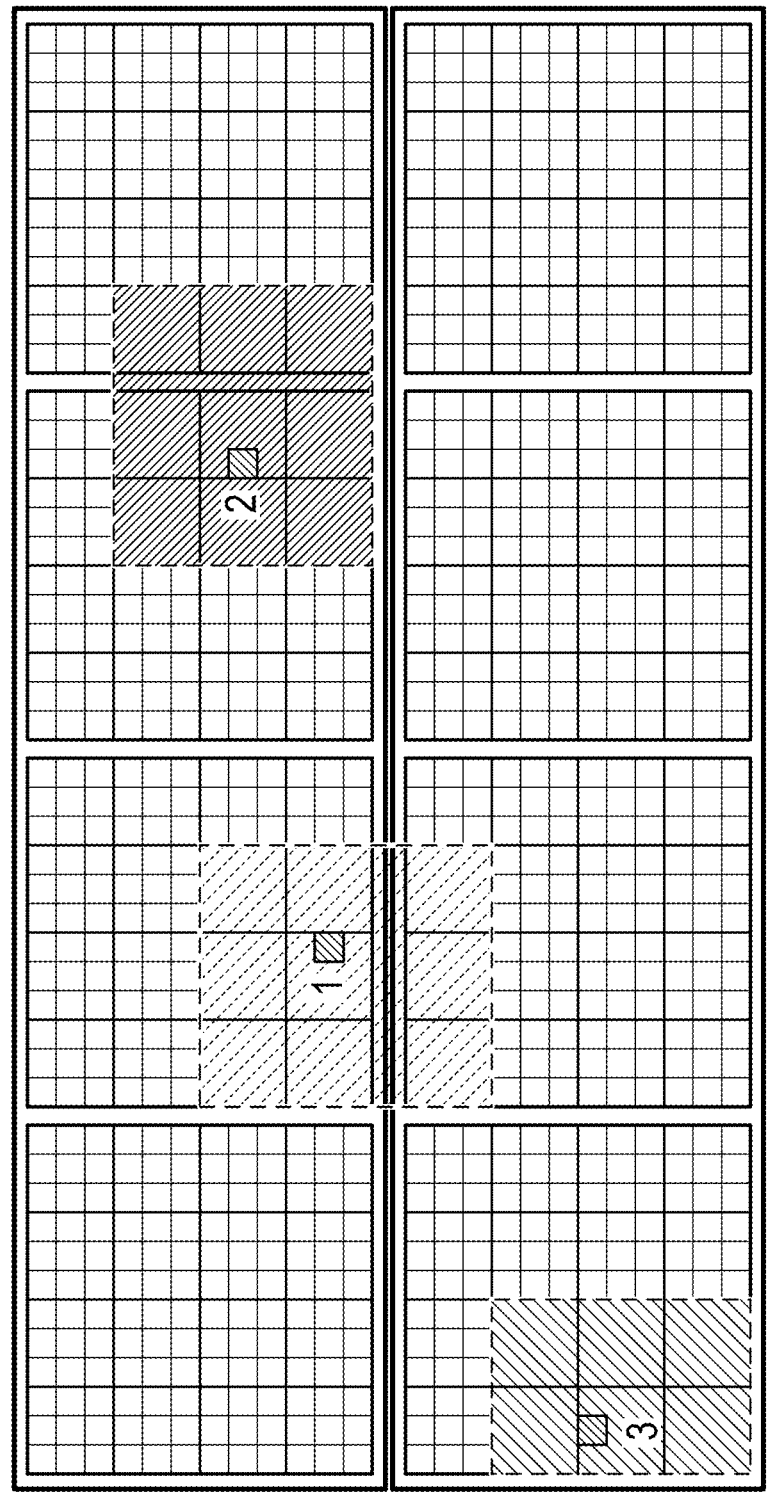
FIG. 8 shows a schematic of additional zone assignments, according to an embodiment of the present disclosure.

FIG. 7 shows a diagram of the assembled demultiplexer module when triaging events, according to an embodiment of the present disclosure. FIG. 8 shows a schematic of additional zone assignments, according to an embodiment of the present disclosure. In an embodiment, upon not satisfying conditions (i) and (ii), a second parameterized cell 205b can be instantiated including a second time window based on a time of detection for the second event, which can be determined to be a primary event. Similarly, upon not satisfying conditions (i) and (ii), a third parameterized cell 205c can be instantiated including a third time window based on a time of detection for a third event, which can be determined to be a primary event. As shown in FIG. 8, the second event and the third event can be detected outside the first zone assignment of the first event. The second parameterized cell 205b can also generate a second zone assignment, wherein a size (i.e. coverage) and location of the second zone assignment can be based on a location of detection for the second event in order to compare against subsequent incoming events. Similarly, the third parameterized cell 205c can also generate a third zone assignment, wherein a size (i.e. coverage) and location of the third zone assignment can be based on a location of detection for the third event in order to compare against subsequent incoming events. As shown in FIG. 8, the zone assignments for the second event and the third event are similar in size and shape as the first event, and similarly centered over the respective event's detected location.

Figure 9:
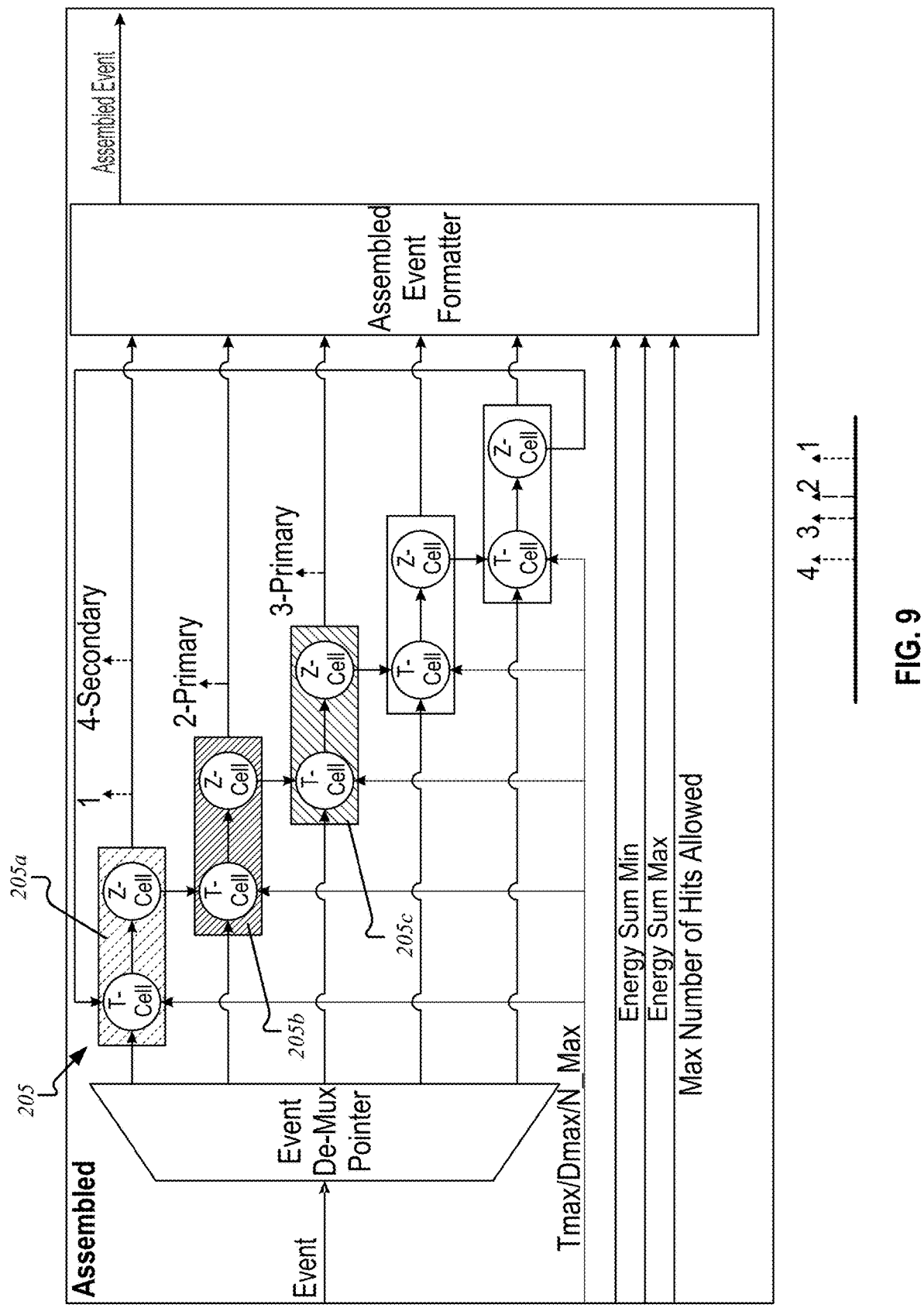
FIG. 9 shows a block diagram of an assembled demultiplexer module when detecting a scatter event, according to an embodiment of the present disclosure.
Figure 10:
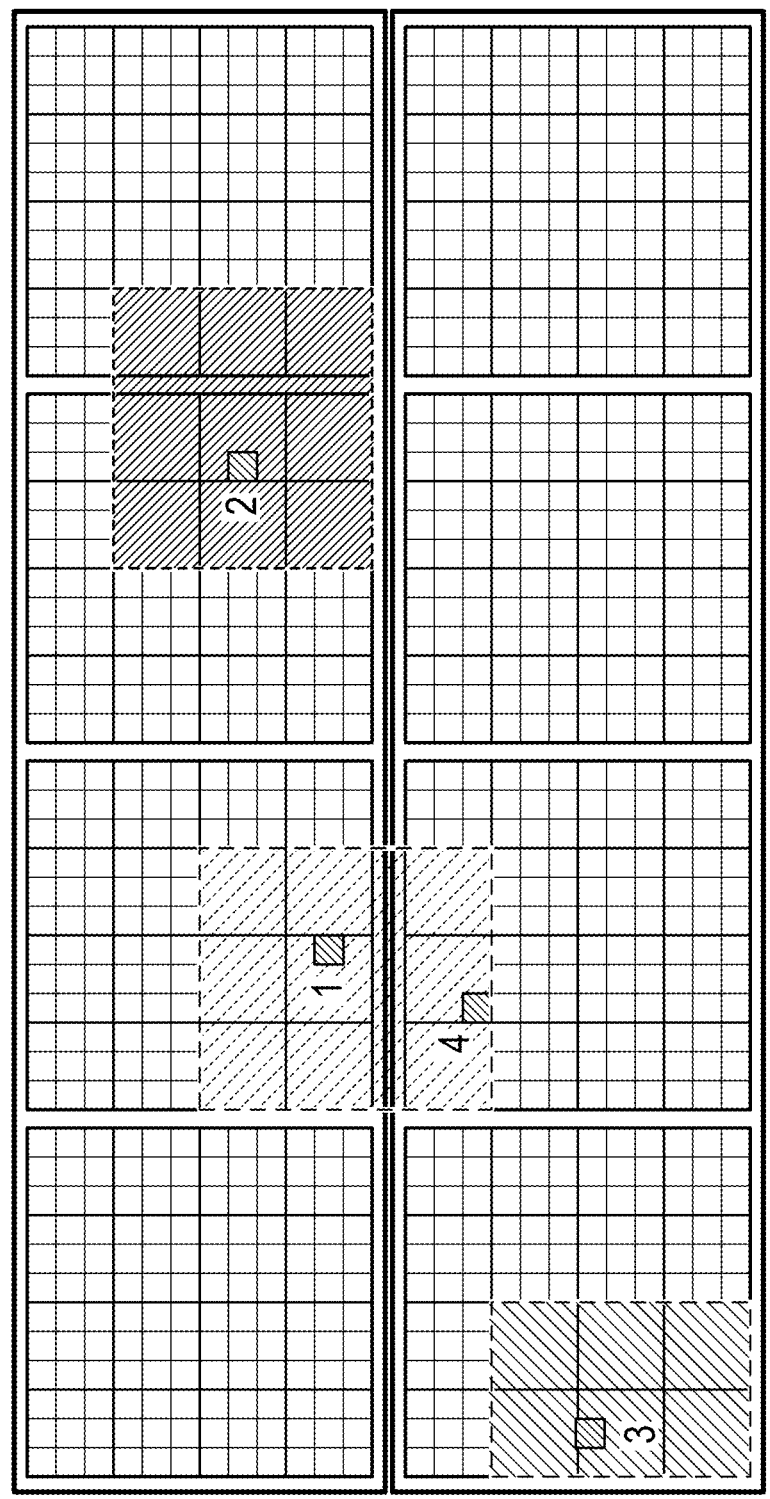
FIG. 10 shows a schematic of a zone assignment for a scatter event, according to an embodiment of the present disclosure.

FIG. 9 shows a block diagram of the assembled demultiplexer module when detecting a scatter event, according to an embodiment of the present disclosure. FIG. 10 shows a schematic of the zone assignment for a scatter event, according to an embodiment of the present disclosure. In an embodiment, the event pointer can designate the first parameterized cell 205a as the active parameterized cell. A fourth event can be detected and evaluated by the active parameterized cell, for example the first parameterized cell 205a, and determined to be within the first time window and the first zone assignment of the first event. Thus, the fourth event can be determined to be a scatter (i.e. secondary) event stemming from the first event and grouped as such with the first event.

Figure 11:
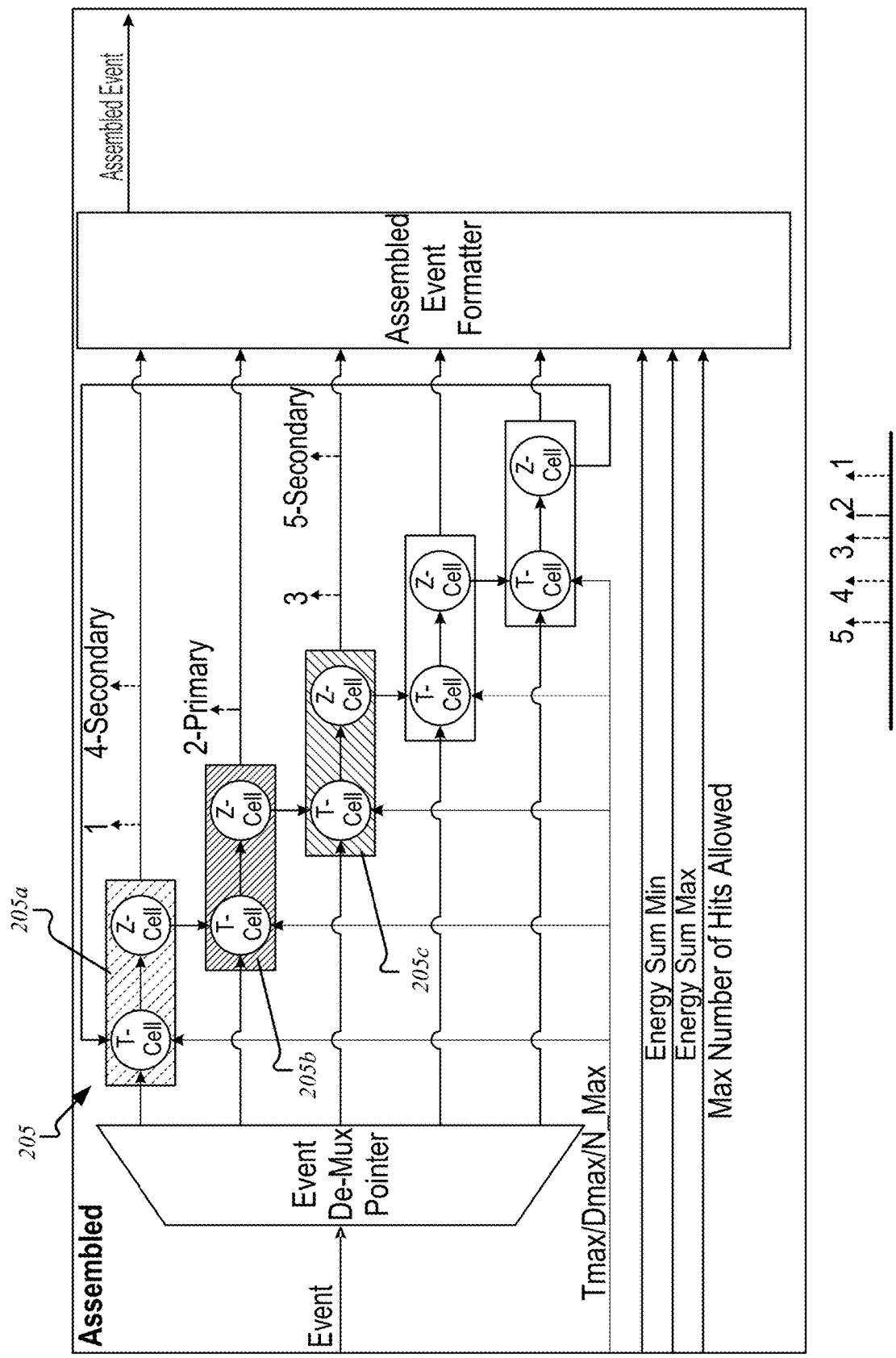
FIG. 11 shows a block diagram of an assembled demultiplexer module when detecting a scatter event, according to an embodiment of the present disclosure.
Figure 12:
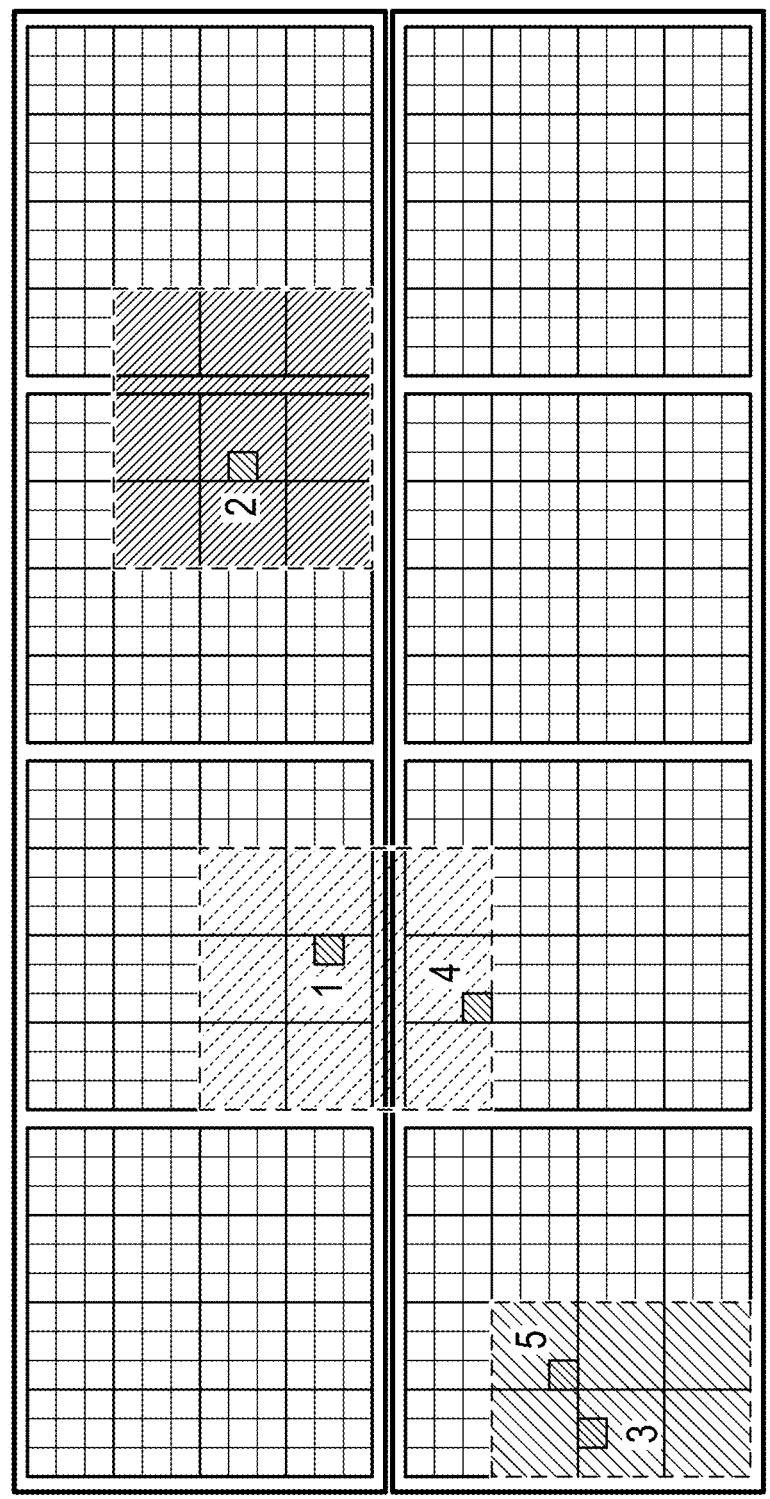
FIG. 12 shows a schematic of a zone assignment for a scatter event, according to an embodiment of the present disclosure.

FIG. 11 shows a block diagram of the assembled demultiplexer module when detecting a scatter event, according to an embodiment of the present disclosure. FIG. 12 shows a schematic of the zone assignment for a scatter event, according to an embodiment of the present disclosure. In an embodiment, a fifth event can be detected and evaluated by the active parameterized cell, for example the first parameterized cell 205a, and determined to be outside the first time window or the first zone assignment. The information of the fifth event can then be evaluated by the second parameterized cell 205b and determined to be outside the second time window or the second zone assignment. The information of the fifth event can then be evaluated by the third parameterized cell 205c and determined to be within the third time window and the third zone assignment. Thus, the fifth event can be determined to be a scatter (i.e. secondary) event stemming from the third event and grouped as such with the third event.

Figure 13:
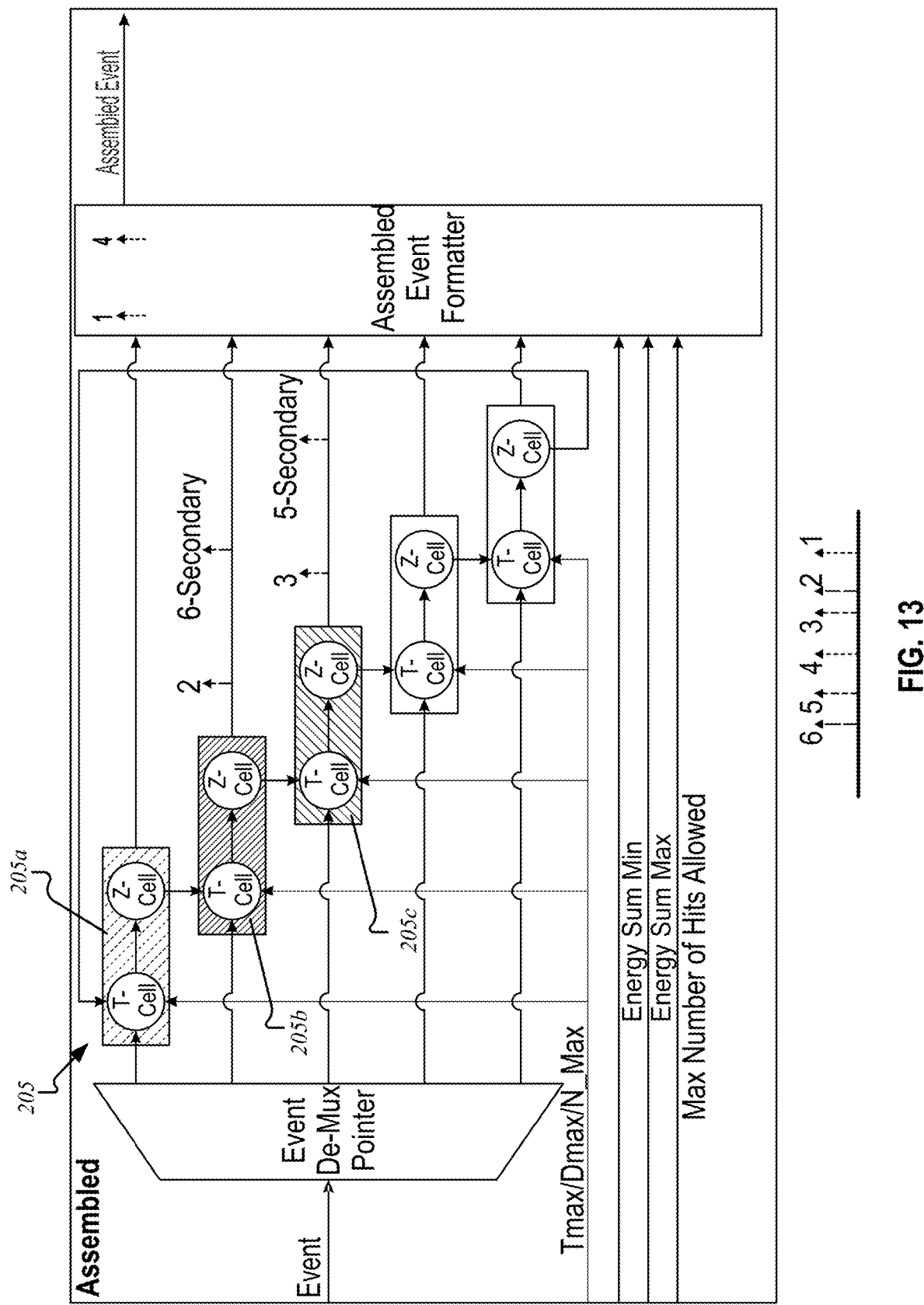
FIG. 13 shows a block diagram of the assembled demultiplexer module when detecting a scatter event, according to an embodiment of the present disclosure.
Figure 14:
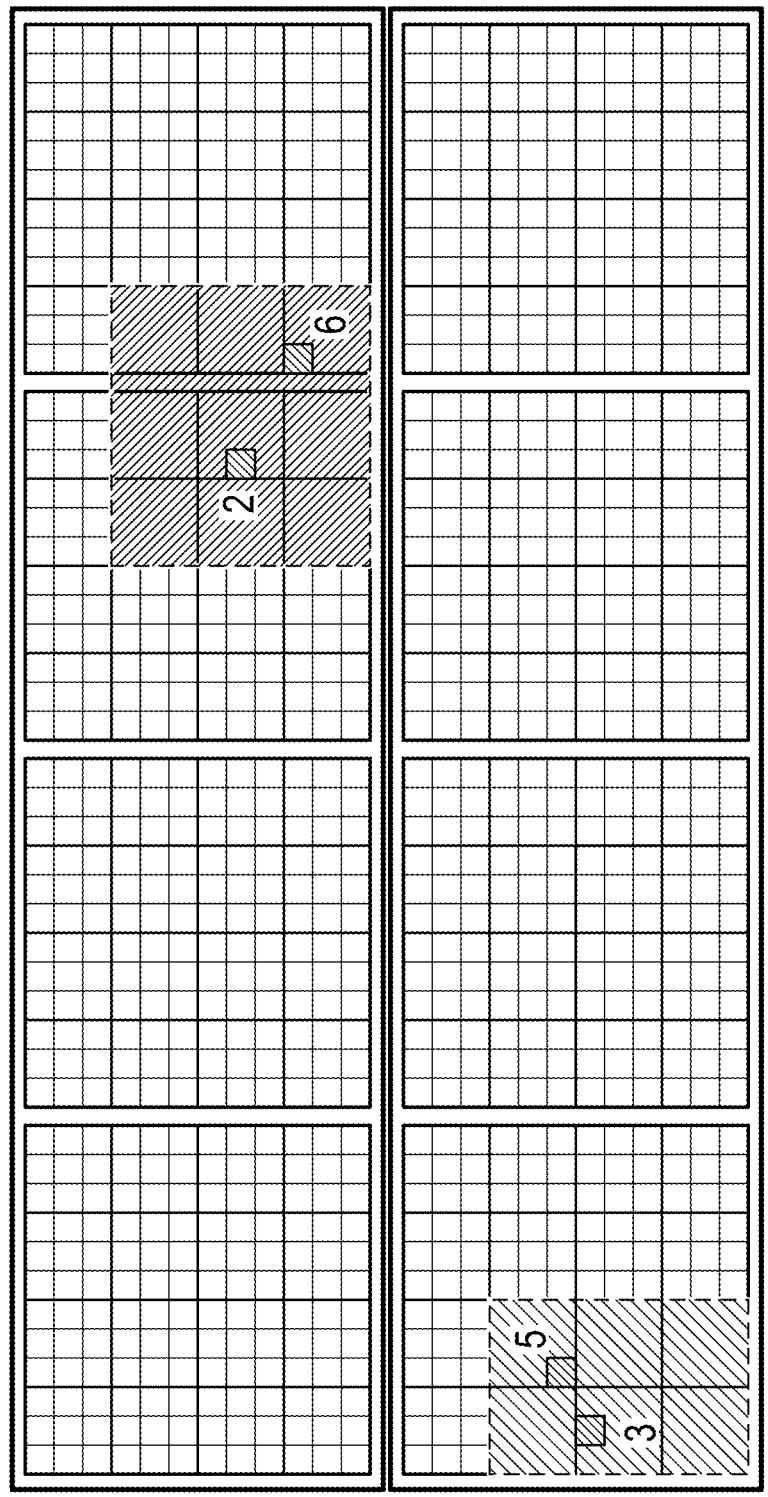
FIG. 14 shows a schematic of a zone assignment for a scatter event, according to an embodiment of the present disclosure.

FIG. 13 shows a block diagram of the assembled demultiplexer module when detecting a scatter event, according to an embodiment of the present disclosure. FIG. 14 shows a schematic of the zone assignment for a scatter event, according to an embodiment of the present disclosure. In an embodiment, a sixth event can be detected and evaluated by the active parameterized cell, for example the first parameterized cell 205a, and determined to be outside the first time window or the first zone assignment. The information of the sixth event can then be evaluated by the second parameterized cell 205b and determined to be within the second time window and the second zone assignment. Thus, the sixth event can be determined to be a scatter (i.e. secondary) event stemming from the second event and grouped as such with the second event.

In an embodiment, upon determining the detection time of the sixth event is beyond the length of the first time window, the event pointer can increment and designate the second parameterized cell 205b as the active cell. Thus, the sixth event can skip evaluation by the first parameterized cell 205a since the window of time has closed for any potential additional scatter events stemming from the first event. Furthermore, upon incrementing the event pointer to the second parameterized cell 205b, all captured detection events data from the first parameterized cell 205a can be transmitted. For example, the captured detection events data can be transmitted to an assembled event formatter and then to a centralized controller for further processing. After, the first parameterized cell 205a can be considered empty and ready to receive the next available detected event data.

Figure 15:
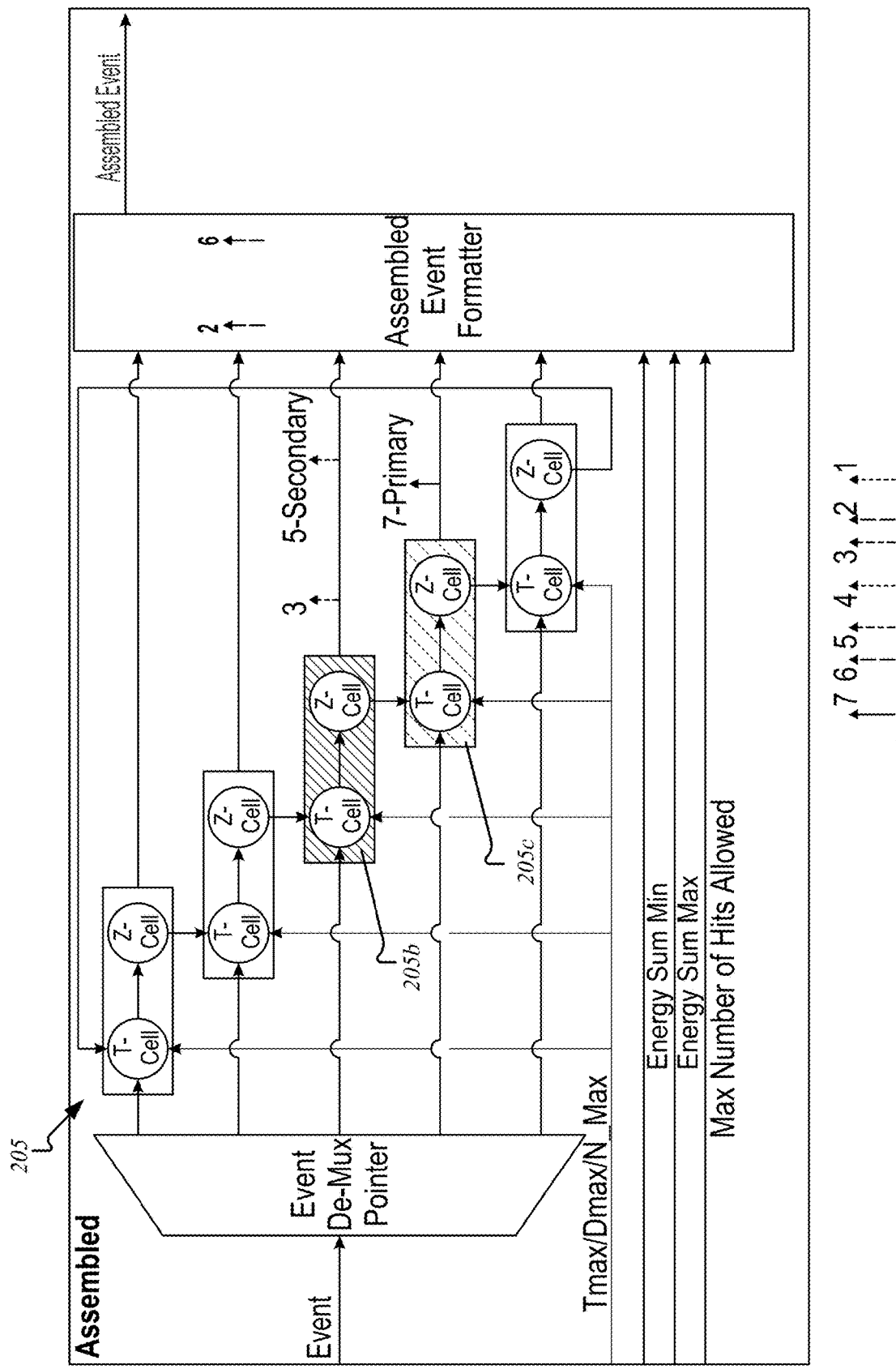
FIG. 15 shows a block diagram of an assembled demultiplexer module when detecting a new primary event, according to an embodiment of the present disclosure.
Figure 16:
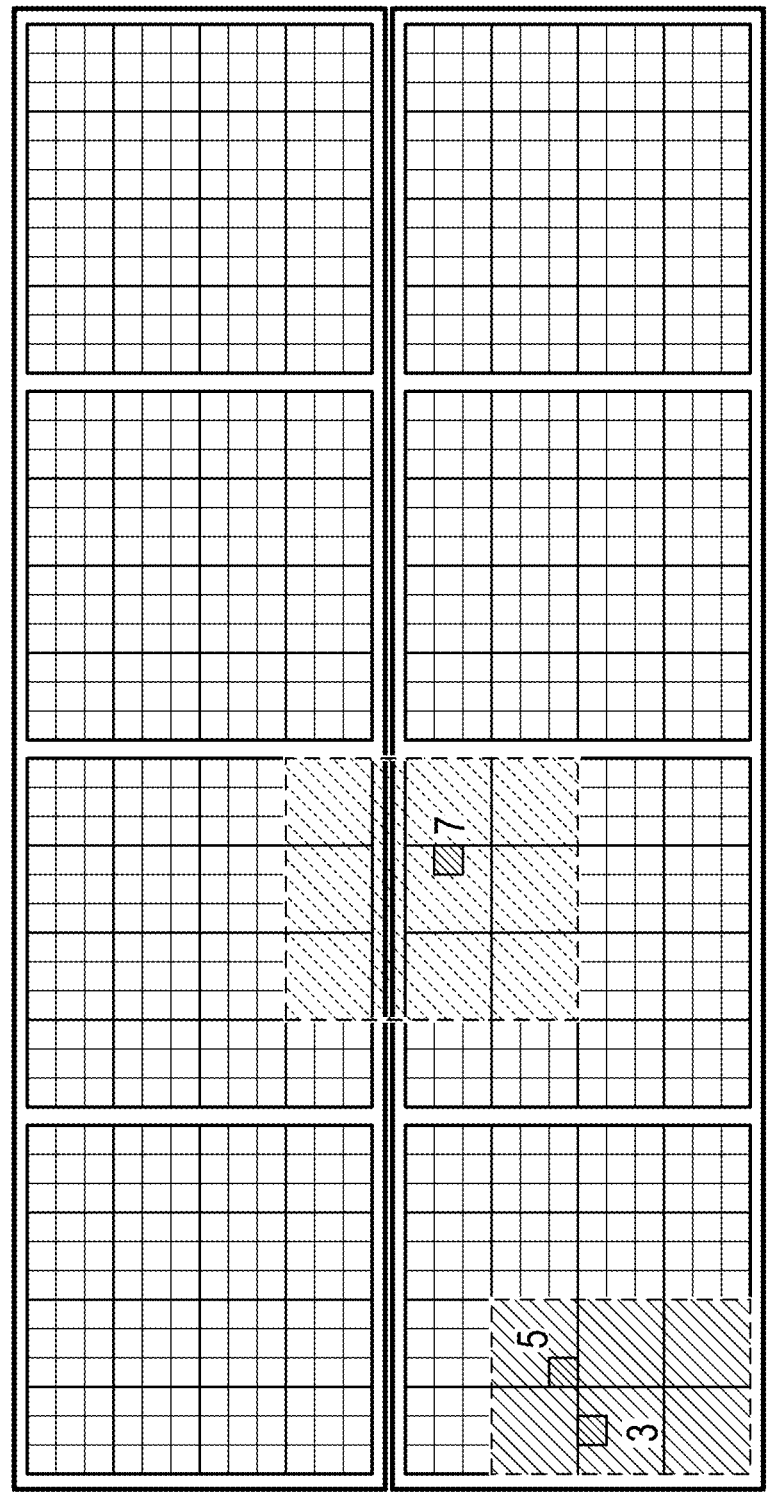
FIG. 16 shows a schematic of a zone assignment for a new primary event, according to an embodiment of the present disclosure.

FIG. 15 shows a block diagram of the assembled demultiplexer module when detecting a new primary event, according to an embodiment of the present disclosure. FIG. 16 shows a schematic of the zone assignment for the new primary event, according to an embodiment of the present disclosure. In an embodiment, a seventh event can be detected and evaluated by the active parameterized cell, for example the second parameterized cell 205b, and determined to be outside the second time window or the second zone assignment. The information of the seventh event can then be evaluated by the third parameterized cell 205c and determined to be outside the third time window or the third zone assignment. As such, a fourth parameterized cell 205d can be instantiated including a fourth time window based on a time of detection for the seventh event upon not satisfying conditions (i) and (ii), wherein the seventh event is determined to be a primary event. The fourth parameterized cell 205d can also generate a fourth zone assignment, wherein a size (i.e. coverage) and location of the fourth zone assignment can be based on a location of detection for the seventh event in order to compare against subsequent incoming events.

In an embodiment, upon determining the detection time of the seventh event is beyond the length of the second time window, the event pointer can increment and designate the third parameterized cell 205c as the active cell. Thus, the seventh event can skip evaluation by the second parameterized cell 205b since the window of time has closed for any potential additional scatter events stemming from the second event. Furthermore, upon incrementing the event pointer to the third parameterized cell 205c, all captured detection events data from the second parameterized cell 205b can be transmitted.

In an embodiment, processing circuitry performs the aforementioned steps of detecting the events, sorting the events, and assigning the events to corresponding cells in the assembled demultiplexer module. For example, the processing circuitry can be implemented in an FPGA to facilitate real-time processing. The FPGA can use the cell modules cascaded with identical parametrized cells, in a pipeline fashion, having the last cell in the chain circle back to the first cell when the corresponding time window has closed for the cell. Furthermore, the processing circuitry (e.g. in the FPGA) can be communicatively coupled to the PET scanner 100 and disposed proximal to the detector array 130 to further facilitate real-time processing. This provides a scalable solution with no internal or external memory requirements and the cell chain skeleton removes the need for extra resource (comparators, RAM), simplifies the logic, and speeds up data transfer.

Notably, the parameterized cells 205 are time aware. That is, in the case of an event, followed by a long pause in the incoming stream of events, the active parameterized cell will accept the event as primary, and when the time window elapses, will transmit the event (and all related event(s)) information to an output and the event pointer will increment to the next parameterized cell 205. Additionally, the parameterized cells 205 can prioritize inputs from previous cells over events coming from the event pointer. In this case, an event present on the event pointer port will be held for one clock cycle, and then read into the target parameterized cell 205.

Discarding events due to scattered energy deposited can reduce the singles 115 sensitivity by approximately 30%, and the pairs sensitivity by approximately 50% (the singles 115 efficiency squared).

Advantageously, the data including the non-discarded scattered events, being more sensitive for both the singles 115 and the pairs, can be used to reconstruct a more accurate final image of the scanned object to improve diagnoses and other medically relevant applications.

In summary, the events will arrive in streaming order and will be processed in real time without any piping, buffering, or delays. The circular logic nature of the mechanism (i.e. the active parameterized cell becomes the last parameterized cell in the linked chain upon closure of a time window)

allows optimization of resources (e.g. FPGA resources) and increases throughput performance.

Figure 17:
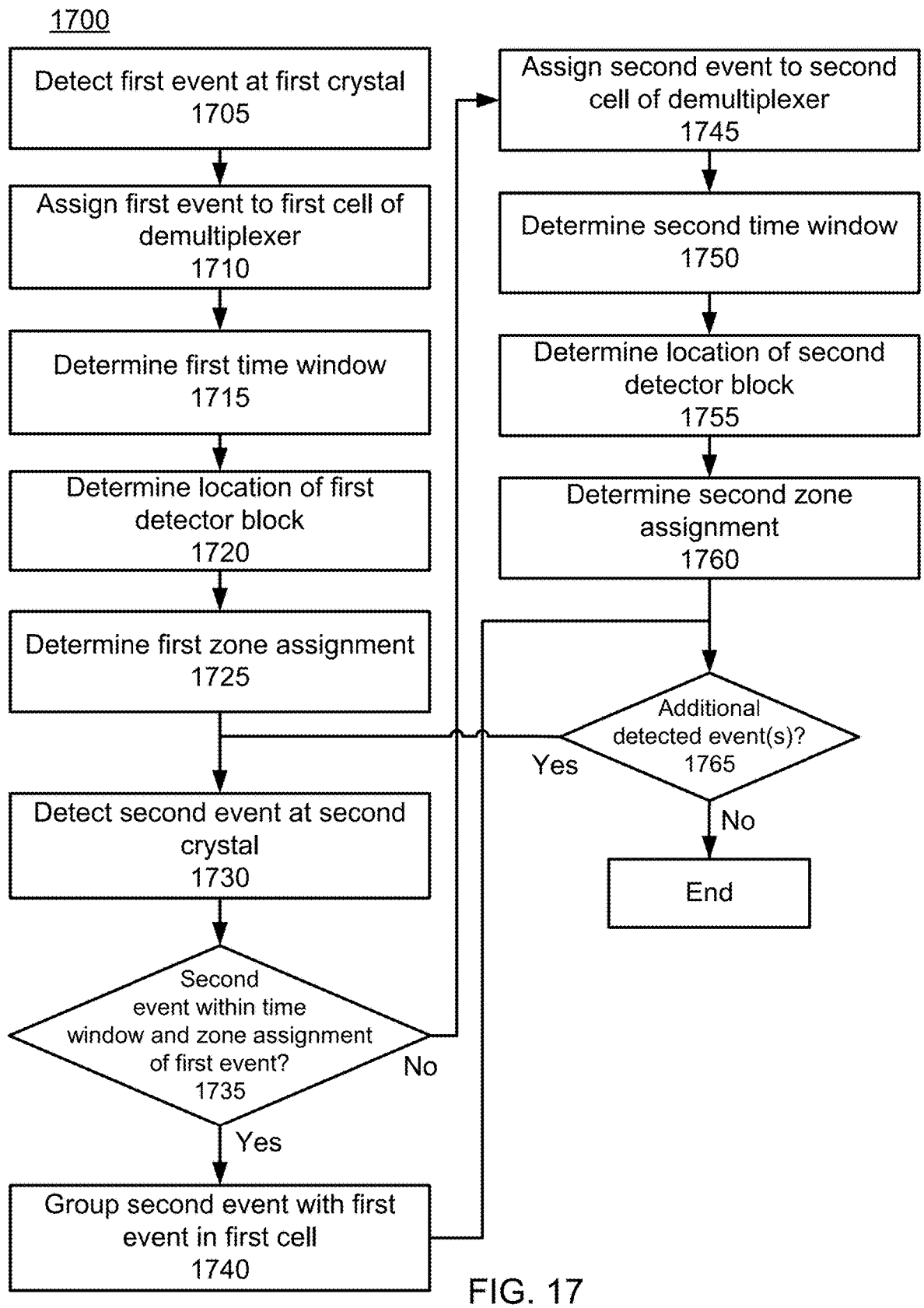
FIG. 17 shows a non-limiting example of a flow chart for a method of grouping detected events, according to an embodiment of the present disclosure.

FIG. 17 shows a non-limiting example of a flow chart for a method 1700 of grouping detected events, according to an embodiment of the present disclosure. In step 1705, the first event is detected at the first crystal 105a. In step 1710, the first event is assigned to the first parameterized cell 205a. In step 1715, the first time window for the first event is determined. In step 1720, the location of the first detector block of the detector blocks 130 is determined. In step 1725, the first zone assignment is determined for the first event. In step 1730, the second event is detected at a second crystal (this second crystal need not be the same as the second crystal 105b). In step 1735, it is determined if the second event can be grouped with the first event based on the time of detection and location of detection of the second event. If the second event is detected within the first time window and the first zone assignment of the first event, the second event is grouped with the first event in the first parameterized cell 205a in step 1740. If not, the second event is assigned to the second parameterized cell 205b of the demultiplexer in step 1745. In step 1750, the second time window for the second event is determined. In step 1755, the location of the second detector block of the detector blocks 130 is determined. In step 1760, the second zone assignment is determined for the second event. In step 1765, it is determined if there are additional events to be detected. If additional events are to be detected, the method 1700 repeats starting at step 1730. If not, the method 1700 ends.

FIGS. 18A and 18B show a non-limiting example of a PET scanner 1800 that can implement the methods 100 and 200. The PET scanner 1800 includes a number of gamma-ray detectors (GRDs) (e.g., GRD1, GRD2, through GRDN) that are each configured as rectangular detector modules. According to one implementation, the detector ring includes 40 GRDs. In another implementation, there are 48 GRDs, and the higher number of GRDs is used to create a larger bore size for the PET scanner 1800.

Each GRD can include a two-dimensional array of individual detector crystals, which absorb gamma radiation and emit scintillation photons. The scintillation photons can be detected by a two-dimensional array of photomultiplier tubes (PMTs) that are also arranged in the GRD. A light guide can be disposed between the array of detector crystals and the PMTs.

Alternatively, the scintillation photons can be detected by an array a silicon photomultipliers (SiPMs), and each individual detector crystals can have a respective SiPM.

Each photodetector (e.g., PMT or SiPM) can produce an analog signal that indicates when scintillation events occur, and an energy of the gamma ray producing the detection event. Moreover, the photons emitted from one detector crystal can be detected by more than one photodetector, and, based on the analog signal produced at each photodetector, the detector crystal corresponding to the detection event can be determined using Anger logic and crystal decoding, for example.

FIG. 18B shows a schematic view of a PET scanner system having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIGS. 18A and 18B. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 18B shows an example of the arrangement of the PET scanner 1800, in which the object OBJ to be imaged rests on a table 1816 and the GRD modules GRD1 through GRDN are arranged circumferentially around the object OBJ and the table 1816. The GRDs can be fixedly connected to a circular component 1820 that is fixedly connected to the gantry 1840. The gantry 1840 houses many parts of the PET imager. The gantry 1840 of the PET imager also includes an open aperture through which the object OBJ and the table 1816 can pass, and gamma-rays emitted in opposite directions from the object OBJ due to an annihilation event can be detected by the GRDs and timing and energy information can be used to determine coincidences for gamma-ray pairs.

In FIG. 18B, circuitry and hardware is also shown for acquiring, storing, processing, and distributing gamma-ray detection data. The circuitry and hardware include: a processor 1870, a network controller 1874, a memory 1878, and a data acquisition system (DAS) 1876. The PET imager also includes a data channel that routes detection measurement results from the GRDs to the DAS 1876, the processor 1870, the memory 1878, and the network controller 1874. The DAS 1876 can control the acquisition, digitization, and routing of the detection data from the detectors. In one implementation, the DAS 1876 controls the movement of the bed 1816. The processor 1870 performs functions including reconstructing images from the detection data, pre-reconstruction processing of the detection data, and post-reconstruction processing of the image data, as discussed herein.

The processor 1870 can be configured to perform various steps of methods 100 and/or 200 described herein and variations thereof. The processor 1870 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 1870 can execute a computer program including a set of computer-readable instructions that perform various steps of method 100 and/or method 200, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

The memory 1878 can be a hard disk drive, CD-ROM drive, DVD drive, FLASH drive, RAM, ROM or any other electronic storage known in the art.

The network controller 1874, such as an Intel Ethernet PRO network interface card from Intel Corporation of America, can interface between the various parts of the PET imager. Additionally, the network controller 1874 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Embodiments of the present disclosure may also be as set forth in the following parentheticals.

(1) An imaging apparatus, comprising: processing circuitry configured to detect a first event at a first detector crystal in a detector array including detector crystals grouped into detector blocks, each detector crystal configured to detect primary events of gamma rays and secondary scattering events of the gamma rays, the first event including first time information, first energy information, and first location information, assign the first event and the first time information, the first energy information, and the first location information to a first cell of a demultiplexer, determine, based on the first time information of the first event, a first time window for the first event, the first time window having a predetermined length of time, determine, based on the first location information of the first event, a location of a first detector block including the first detector crystal, determine a first zone assignment of the first event, the first zone assignment including at least the first detector block and defining an area around the first detector block within which additional events can be detected and related to the first event, detect a second event at a second detector crystal, the second event including second time information, second energy information, and second location information, determine, based on the second time information and the second location information of the second event, if the second event is detected within the first time window of the first event and within the first zone assignment of the first event, upon determining the second event is detected within the first time window and the first zone assignment of the first event, group the second event with the first event in the first cell of the demultiplexer, the second event being a detected scatter event of the first event, and upon determining the second event is not detected within the first time window or within the first zone assignment of the first event, assign the second event and the second time information, the second energy information, and the second location information to a second cell of the demultiplexer, the second event being a detected primary event.

(2) The apparatus of (1), wherein the processing circuitry is further configured to assign an event pointer configured to determine an activity status of the first cell in the demultiplexer based on the first time window for the first event and route detected events to the first cell for comparison, and upon determining a third event including third time information is detected outside the predetermined length of time of the first time window for the first event, assign the event pointer to the second cell of the demultiplexer, and transmit information in the first cell of the demulitplexer to a receiving device.

(3) The apparatus of (2), wherein the processing circuitry is further configured to reconstruct an image based on a dataset including the transmitted information in the cells of the demultiplexer.

(4) The apparatus of any one of (1) to (3), wherein the processing circuitry is further configured to upon determining the second event is not detected within the first time window or within the first zone assignment of the first event: determine, based on the second time information of the second event, a second time window for the second event, the second time window having the predetermined length of time, determine, based on the second location information of the second event, a location of a second detector block including the second detector crystal, and determine a second zone assignment of the second event, the second zone assignment including at least the second detector block and defining an area around the second detector block within which additional events can be detected and related to the second event.

(5) The apparatus of any one of (1) to (4), wherein the processing circuitry is further configured to the processing circuitry is communicatively coupled to the detector array and disposed substantially proximal to the detector array, and the processing circuitry is further configured to detect a new event, determine if the new event is detected within the time window and zone assignment of a previously detected event, and assign the new event to a cell in the demultiplexer as each gamma ray is detected.

(6) The apparatus of any one of (1) to (5), wherein the demultiplexer is implemented in at least one of the group of an FPGA, an ASIC, and an EEPROM.

(7) The apparatus of any one of (1) to (6), wherein each cell of the multiplexer is configured to group two events for the detected gamma rays, the two event grouping representing a single Compton scattering event following the primary event.

(8) The apparatus of any one of (1) to (7), wherein each cell of the multiplexer is configured to group three events for the detected gamma rays, the three event grouping representing a double Compton scattering event following the primary event.

(9) A method of grouping detected events in an imaging apparatus, comprising detecting a first event at a first detector crystal in a detector array including detector crystals grouped into detector blocks, each detector crystal configured to detect primary events of gamma rays and secondary scattering events of the gamma rays, the first event including first time information, first energy information, and first location information; assigning the first event and the first time information, the first energy information, and the first location information to a first cell of a demultiplexer; determining, based on the first time information of the first event, a first time window for the first event, the first time window having a predetermined length of time; determining, based on the first location information of the first event, a location of a first detector block including the first detector crystal; determining a first zone assignment of the first event, the first zone assignment including at least the first detector block and defining an area around the first detector block within which additional events can be detected and related to the first event; detecting a second event at a second detector crystal, the second event including second time information, second energy information, and second location information; determining, based on the second time information and the second location information of the second event, if the second event is detected within the first time window of the first event and within the first zone assignment of the first event; upon determining the second event is detected within the first time window and the first zone assignment of the first event, grouping the second event with the first event in the first cell of the demultiplexer, the second event being a detected scatter event of the first event; and upon determining the second event is not detected within the first time window or within the first zone assignment of the first event, assigning the second event and the second time information, the second energy information, and the second location information to a second cell of the demultiplexer, the second event being a detected primary event.

(10) The method of (9), further comprising assigning an event pointer configured to determine an activity status of the first cell in the demultiplexer based on the first time window for the first event and route detected events to the first cell for comparison; and upon determining a third event including third time information is detected outside the predetermined length of time of the first time window for the first event: assigning the event pointer to the second cell of the demultiplexer; and transmitting information in the first cell of the demulitplexer to a receiving device.

(11) The method of (10), further comprising reconstructing an image based on a dataset including the transmitted information in the cells of the demultiplexer.

(12) The method of any one of (9) to (11), further comprising upon determining the second event is not detected within the first time window or within the first zone assignment of the first event: determining, based on the second time information of the second event, a second time window for the second event, the second time window having the predetermined length of time; determining, based on the second location information of the second event, a location of a second detector block including the second detector crystal; and determining a second zone assignment of the second event, the second zone assignment including at least the second detector block and defining an area around the second detector block within which additional events can be detected and related to the second event.

(13) The method of any one of (9) to (12), wherein the detecting a new event, determining if the new event is detected within the time window and zone assignment of a previously detected event, and assigning the new event to a cell in the demultiplexer is executed as each gamma ray is detected.

(14) The method of any one of (9) to (13), wherein the demultiplexer is implemented in at least one of the group of an FPGA, an ASIC, and an EEPROM.

(15) The method of any one of (9) to (14), wherein each cell of the multiplexer is configured to group two events for the detected gamma rays, the two event grouping representing a single Compton scattering event following the primary event.

(16) The method of any one of (9) to (15), wherein each cell of the multiplexer is configured to group three events for the detected gamma rays, the three event grouping representing a double Compton scattering event following the primary event.

(17) A non-transitory computer-readable storage medium including executable instructions, which when executed by circuitry, cause the circuitry to perform a method of grouping detected events in an imaging apparatus, comprising detecting a first event at a first detector crystal in a detector array including detector crystals grouped into detector blocks, each detector crystal configured to detect primary events of gamma rays and secondary scattering events of the gamma rays, the first event including first time information, first energy information, and first location information; assigning the first event and the first time information, the first energy information, and the first location information to a first cell of a demultiplexer; determining, based on the first time information of the first event, a first time window for the first event, the first time window having a predetermined length of time; determining, based on the first location information of the first event, a location of a first detector block including the first detector crystal; determining a first zone assignment of the first event, the first zone assignment including at least the first detector block and defining an area around the first detector block within which additional events can be detected and related to the first event; detecting a second event at a second detector crystal, the second event including second time information, second energy information, and second location information; determining, based on the second time information and the second location information of the second event, if the second event is detected within the first time window of the first event and within the first zone assignment of the first event; upon determining the second event is detected within the first time window and the first zone assignment of the first event, grouping the second event with the first event in the first cell of the demultiplexer, the second event being a detected scatter event of the first event; and upon determining the second event is not detected within the first time window or within the first zone assignment of the first event, assigning the second event and the second time information, the second energy information, and the second location information to a second cell of the demultiplexer, the second event being a detected primary event.

(18) The computer-readable storage medium of (17), wherein the method further comprises assigning an event pointer configured to determine an activity status of the first cell in the demultiplexer based on the first time window for the first event and route detected events to the first cell for comparison; and upon determining a third event including third time information is detected outside the predetermined length of time of the first time window for the first event; assigning the event pointer to the second cell of the demultiplexer; and transmitting information in the first cell of the demulitplexer to a receiving device.

(19) The computer-readable storage medium of (18), wherein the method further comprises reconstructing an image based on a dataset including the transmitted information in the cells of the demultiplexer.

(20) The computer-readable storage medium of any one of (17) to (19), wherein the method further comprises upon determining the second event is not detected within the first time window or within the first zone assignment of the first event: determining, based on the second time information of the second event, a second time window for the second event, the second time window having the predetermined length of time; determining, based on the second location information of the second event, a location of a second detector block including the second detector crystal; and determining a second zone assignment of the second event, the second zone assignment including at least the second detector block and defining an area around the second detector block within which additional events can be detected and related to the second event.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. An imaging apparatus, comprising:
   processing circuitry configured to
      detect a first event and a second event of gamma rays detected at detector crystals,
      group the second event in a first cell of parameterized cells included in a demultiplexer same as the first event, wherein the parameterized cells are connected back to back and form a circular operating chain, when the second event satisfies both of (1) a time window determined by the first event, and (2) a first zone assignment determined by a location of detection for the first event, and
      group the second event in a second cell of the parameterized cells, different from the first cell, when the second event does not satisfy at least one of the time window and the first zone assignment.

2. The apparatus of claim 1, wherein the processing circuitry is further configured to:
   detect the first event at a first detector crystal included in the detector crystals, the first event including first time information, first energy information, and first location information,
   assign the first event, the first time information, the first energy information, and the first location information to the first cell,
   determine, as the time window, a first time window having a predetermined length of time based on the first time information,
   determine a first zone assignment including the first detector crystal based on the first location information,
   detect the second event at a second detector crystal, the second event including second time information, second energy information, and second location information,
   determine, based on the second time information and the second location information, whether the second event is detected within the first time window and within the first zone assignment,
   group the second event with the first event in the first cell, the second event being a detected scatter event of the first event, when the second event is determined as detected within the first time window and within the first zone assignment, and
   group the second event in the second cell, the second event being a detected primary event, when the second event does not satisfy at least one of the first time window and the first zone assignment.

3. The apparatus of claim 2, wherein the detector crystals are grouped into detector blocks, and the processing circuitry is further configured to:
   determine, based on the first location information, a location of a first detector block including the first detector crystal, and
   determine the first zone assignment, the first zone assignment including at least the first detector block and an area around the first detector block within which additional events can be detected and related to the first event.

4. The apparatus of claim 2, wherein the processing circuitry is further configured to:
   assign an event pointer configured to determine an activity status of the first cell of the parameterized cells based on the first time window for the first event and route detected events to the first cell for comparison, and
   upon determining that a third event including third time information is detected outside the predetermined length of time of the first time window for the first event,
   assign the event pointer to the second cell of the parameterized cells, and
   transmit information in the first cell of the parameterized cells to a receiving device.

5. The apparatus of claim 4, wherein the processing circuitry is further configured to reconstruct an image based on a dataset including the transmitted information in the first cell of the parameterized cells.

6. The apparatus of claim 3, wherein the processing circuitry is further configured to, upon determining the second event does not satisfy at least one of the time window and the first zone assignment,
   determine a second time window having the predetermined length of time based on the second time information,
   determine, based on the second location information, a location of a second detector block including the second detector crystal, and
   determine a second zone assignment, the second zone assignment including at least the second detector block and defining an area around the second detector block within which additional events can be detected and related to the second event.

7. The apparatus of claim 1, wherein
   the processing circuitry is communicatively coupled to a detector array and disposed substantially proximal to the detector array, and
   the processing circuitry is further configured to detect a new event, determine whether the new event is detected within the time window and a zone assignment of a previously detected event, and assign the new event to a cell in the parameterized cells as each gamma ray is detected.

8. The apparatus of claim 1, wherein the demultiplexer is implemented in at least one of a group including an FPGA, an ASIC, and an EEPROM.

9. The apparatus of claim 1, wherein each cell of the parameterized cells is configured to group two events for the detected gamma rays, the two events representing a single Compton scattering event following a primary event.

10. The apparatus of claim 1, wherein each cell of the parameterized cells is configured to group three events for the detected gamma rays, the three events representing a double Compton scattering event following a primary event.

11. A method of grouping detection events in an imaging apparatus, comprising:
grouping a second event of gamma rays detected at detector crystals in a first cell of parameterized cells included in a demultiplexer same as a first event of the gamma rays, wherein the parameterized cells are connected back to back and form a circular operating chain, when the second event satisfies both of (1) a time window determined by the first event, and (2) a first zone assignment determined by a location of detection for the first event; and
grouping the second event in a second cell of the parameterized cells, different from the first cell, when the second event does not satisfy at least one of the time window and the first zone assignment.

12. The imaging apparatus of claim 1, wherein the processing circuitry is further configured to determine the first zone assignment dynamically so that the location of the detection for the first event is centered in the first zone assignment.

13. The imaging apparatus of claim 1, wherein the first cell is configured to determine boundaries of the first zone assignment.

* * * * *